（12）United States Patent
Runyon et al.

(10) Patent No.: US 8,140,005 B2
(45) Date of Patent: Mar. 20, 2012

(54) MODULAR SATELLITE TRANSCEIVER

(75) Inventors: Donald L. Runyon, Duluth, GA (US);
Anthony Guy Hamel, Encinitas, CA (US); Timothy J. Martin, Carlsbad, CA (US); William Joshua Sparks, San Marcos, CA (US); Michael Chou, San Marcos, CA (US); Andrew Michael Bacon, Atlanta, GA (US)

(73) Assignee: ViaSat, Inc., Carlsbad, CA (US)

( * ) Notice: Subject to any disclaimer, the term of this patent is extended or adjusted under 35 U.S.C. 154(b) by 847 days.

(21) Appl. No.: 12/175,126

(22) Filed: Jul. 17, 2008

(65) Prior Publication Data
US 2009/0028225 A1    Jan. 29, 2009

Related U.S. Application Data

(60) Provisional application No. 60/961,073, filed on Jul. 17, 2007.

(51) Int. Cl.
*H04B 7/185*    (2006.01)
(52) U.S. Cl. ........ 455/12.1; 455/3.02; 455/23; 455/126; 375/219
(58) Field of Classification Search ................. 455/12.1, 455/3.02, 424, 90.3, 575.1, 575.7, 121, 177.1, 455/190.1, 189.1, 334, 341, 338, 466, 75, 455/78, 255, 269; 370/401, 389, 352, 297, 370/466, 328, 400, 331, 277, 342, 343, 139; 342/352, 359; 375/219, 232; 360/46, 65
See application file for complete search history.

(56) References Cited

U.S. PATENT DOCUMENTS

| 2002/0154059 | A1 | 10/2002 | Lindenmeier et al. |
| 2004/0076127 | A1* | 4/2004 | Porte .............................. 370/328 |
| 2004/0174299 | A1 | 9/2004 | Casas et al. |
| 2005/0101252 | A1 | 5/2005 | Carvalho et al. |
| 2005/0101349 | A1 | 5/2005 | Pihlajamaa et al. |

(Continued)

FOREIGN PATENT DOCUMENTS
WO    WO 2007/065143 A    6/2007

OTHER PUBLICATIONS

PCT International Search Report and Written Opinion mailed Jan. 23, 2009, International Application No. PCT/US2008/070314; 19 pages.

(Continued)

*Primary Examiner* — Tan Trinh
(74) *Attorney, Agent, or Firm* — Kilpatrick Townsend & Stockton LLP

(57) ABSTRACT

A modular satellite transceiver is provided according to some embodiments of the disclosure. The modular transceiver may include an RF module and a back end module. The RF module may operate in a first band, and may include, for example, one or more antennas, an RF front end module, an up converter, a down converter, an analog-to-digital converter, and a digital-to-analog converter. The back end module may include various digital processing components and/or modules. The RF module may be removably coupled with the back end module such that the RF module may be replaced with another RF module operating in a second band. During transmission the back end module may provide at least one digital signal to the RF module; and during reception the RF module provides at least one digital signal to the back end module.

12 Claims, 25 Drawing Sheets

U.S. PATENT DOCUMENTS

| | | |
|---|---|---|
| 2005/0123076 A1 | 6/2005 | Walker et al. |
| 2005/0201277 A1 | 9/2005 | Ohnuma |
| 2005/0272464 A1 | 12/2005 | Ishikawa et al. |
| 2005/0276365 A1 | 12/2005 | Gierl et al. |
| 2005/0285784 A1* | 12/2005 | Chiang et al. ............ 342/359 |
| 2006/0013324 A1 | 1/2006 | Pilgram et al. |
| 2006/0111056 A1 | 5/2006 | Dutta |
| 2006/0160512 A1* | 7/2006 | Lim et al. .................. 455/255 |
| 2007/0040687 A1 | 2/2007 | Reynolds et al. |
| 2007/0165437 A1 | 7/2007 | Scarpa et al. |
| 2008/0201748 A1* | 8/2008 | Hasek et al. ................ 725/98 |
| 2008/0248772 A1* | 10/2008 | Vlad et al. .................. 455/269 |
| 2009/0027260 A1* | 1/2009 | Runyon et al. ............. 342/352 |
| 2009/0034475 A1* | 2/2009 | Runyon et al. ............. 370/331 |

OTHER PUBLICATIONS

Non-Final Office Action of Mar. 29, 2011 for U.S. Appl. No. 12/175,184, 15 pages.

\* cited by examiner

MODULAR SATELLITE TRANSCEIVER

CROSS-REFERENCES TO RELATED APPLICATIONS

This application is a non-provisional, and claims the benefit, of commonly assigned U.S. Provisional Application No. 60/961,073, filed Jul. 17, 2007, entitled "Modular Transceiver And Multi-Beam Antenna System," the entirety of which is herein incorporated by reference for all purposes.

BACKGROUND OF THE INVENTION

This disclosure relates in general to transceivers and, but not by way of limitation, to modular transceivers employing multiple antennas amongst other things.

The escalation of high bandwidth requirements for military and commercial applications increases the need for small, modular transceivers. Military applications, moreover, often require robust and highly reliable systems. In some cases, the choice of communication band may change during an operation. For example, a military operation may require communication over the X-band during part of a mission and communication over the Ku-band over another part of the mission. Current transceiver devices make such conversions extremely cumbersome.

Moreover, as a mobile unit moves, rotates, and/or turns, the line of site between the transceiver and the mobile unit changes over time. Finding and keeping reliable line of sight is demanding. There is a general need in the art for reliable, modular satellite transceivers.

BRIEF SUMMARY

A modular satellite transceiver is provided according to some embodiments. The modular transceiver may include an RF module and a back end module. The RF module may operate in a first band, and may include, for example, one or more antennas, an RF front end module, an up converter, a down converter, an analog-to-digital converter, and a digital-to-analog converter. The back end module may include various digital processing components and/or modules. The RF module may be removably coupled with the back end module such that the RF module may be replaced with another RF module operating in a second band. During transmission the back end module may provide at least one digital signal to the RF module; and during reception the RF module provides at least one digital signal to the back end module.

Another modular satellite transceiver is provided according to some embodiments, and may include an RF module and a back end module. The RF module may include a first antenna, a second antenna, one or more amplifiers, a digital-to-analog converter, an analog-to-digital converter, an up converter, and a down converter. The RF module is configured to receive a packetized digital signal, up convert the signal and transmit the signal to a satellite through the first or second antenna. The RF module may also be configured to receive a signal from the first or second antenna, down convert the signal, and digitize the signal. Moreover, the back end module may be removably coupled with the RF module. The back end module may also include at least a packetization module; and may provide and receive packetized digital signals to and from the RF module.

In some embodiments the back end module may include encryption and/or decryption modules. In other embodiments, the back end module provides power conditioning to at least the RF module. In some embodiments, the digital signal provided by the back end module is independent of communication waveform and/or independent of bandwidth. The back end module, in some embodiments, may packetize transmitted data and/or depacketize received data.

A method for sending packetized data to a satellite using a modular transceiver that includes a back end module and an RF module is also provided according to some embodiments. Data may be digitally packetized at the back end module and provided to the modular front end module. The RF module may then convert the packetized data signal into an analog signal, up convert the analog packetized data signal, and transmit the analog packetized data signal toward the satellite using a first antenna.

Another method for receiving data from a satellite using a modular transceiver that includes a back end module and an RF module is provided according to some embodiments. A data signal is received from a satellite with an antenna at the RF module. The signal may then be down converted and converted from an analog signal into a digital signal at the RF module. The signal may then be digitally demodulated.

Another modular satellite transceiver is provided according to some embodiments, and may include a plurality of antennas and a processor coupled with the antennas. The plurality of antennas may, for example, include a subset of antennas arranged around a central location. The azimuth coverage of the plurality of antennas may comprise up to about 360°. The elevation coverage of each antenna may comprise between about 5° and about 90°. The processor may select at least one antenna from the plurality of antennas for communication with a satellite. The processor may include various instructions including instructions for receiving data from the satellite using a first antenna of the plurality of antennas; instructions for monitoring a second antenna of the plurality of antennas while the first antenna is receiving data from the satellite, wherein the second antenna is adjacent to the first antenna, and the second antenna covers an area adjacent to and overlapping with the area covered by the first antenna; instructions for determining the signal strength of the signal detected from the second antenna; instructions for determining if the signal strength of the signal detected from the second antenna is greater than the signal strength of the signal detected from the first antenna; instructions for switching to the second antenna if the signal strength of the signal detected from the second antenna is greater than the signal strength of the signal detected from the first antenna; and instructions for receiving data from the satellite using the second antenna.

A method for communicating with a satellite using a plurality of antennas is also provided according to some embodiments. The method may include receiving data from the satellite using a first antenna from the plurality of antennas and determining the signal strength of the signal detected from the first antenna. Data may be transmitted to the satellite using the first antenna. A second antenna adjacent to the first antenna may partially overlap with the first antenna in coverage. The signal strength of the signal detected from the second antenna may be monitored. If the signal strength of the signal detected from the second antenna is greater than the signal strength of the signal detected from the first antenna, then data is transmitted over the second antenna.

A method for providing a soft handoff between antennas is provided according to some embodiments. A first packetized digital data stream is received from a satellite using a first antenna and the data stream may include a plurality of packets that each include a header and data. The data is provided, forwarded or stored in memory. In the meantime, a second packetized digital data stream is monitored. The second packetized digital data stream may be received from the satellite using a second antenna. The phase difference between the first packetized digital data stream and the second packetized digital data stream may be determined and added or subtracted from the second packetized digital data stream. The second packetized digital data stream may then be provided, forwarded or stored in memory.

Another method is provided according to some embodiments. The method includes receiving a first packetized digital data stream from a satellite using a first antenna. The first packetized digital data stream includes a plurality of packets, each packet comprising a header and data. A second packetized digital data stream is received from the satellite using a second antenna. The phase difference between the first packetized digital data stream and the second packetized digital data stream is determined and subtracted from the second packetized digital data stream. The two data streams may then be combined.

A satellite transceiver is provided according to some embodiments. The transceiver may include a plurality of antennas, a processor, and memory. At least a subset of the plurality of antennas may be arranged around a central location. The azimuth coverage of the plurality of antennas include at least about 360°. The elevation coverage of each antenna includes between about 50 and about 90°. The processor may be coupled with the plurality of antennas for communication with a satellite. The memory may be configured to store processor instructions and data. The processor instructions may include: Instructions for receiving a first packetized digital data stream, wherein the first packetized digital data stream may be received from a satellite using a first antenna, and wherein the first packetized digital data stream includes a plurality of packets, each packet comprising a header and data; instructions for writing the data from the first packetized digital data stream into memory; instructions for monitoring a second packetized digital data stream, wherein the second packetized digital data stream may be received from the satellite using a second antenna, and wherein the second packetized digital data stream includes a plurality of packets, each packet comprising a header and data; instructions for determining the phase difference between the first packetized digital data stream and the second packetized digital data stream; instructions for subtracting the phase difference to the second packetized digital data stream; and instructions for writing the data from the second packetized digital data stream into memory, in some embodiments, this data may be the result of the phase difference arithmetic.

A modular transceiver with a small footprint is disclosed in one embodiment. The small footprint may be less than about 10 inches wide by 10 inches wide by 4 inches tall. The modular transceiver may be less than about 400 cubic inches in volume. In one alternative, the modular transceiver may be less than about 305 cubic inches.

A transceiver with more than one antenna group is also disclosed according to one embodiment. Each antenna group may include at least one antenna and may be configured to transmit and receive a signal using a single antenna within the antenna group. In one embodiment the transceiver may include a first group, a second group, and a third group; the first group may include three antennas, the second group comprises three antennas, and the third group comprises one antenna. The transceiver may provide 360° azimuth coverage. The transceiver may provide at least about 5° to about 90° elevation coverage.

A modular transceiver comprising a small footprint is disclosed according to one embodiment. A transceiver comprising more than one antenna group is also disclosed according to another embodiment. The transceiver may comprise antenna groups each with at least one antenna. Each antenna group may also be configured to transmit and receive a signal using a single antenna within the antenna group. The transceivers disclosed according to embodiments of the invention may also provide 360° azimuth coverage and at least about 5° to 90° elevation coverage.

Figure 1A:
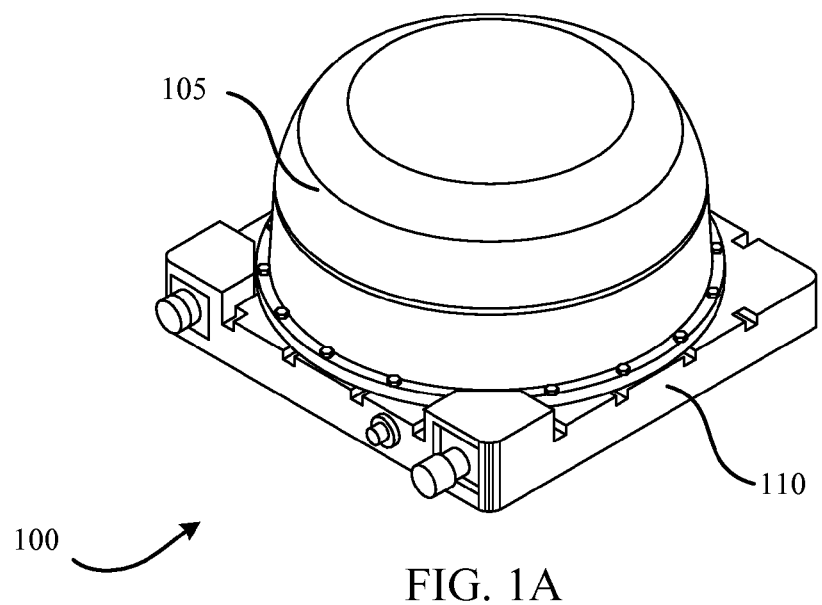
FIGS. 1A-1C show a perspective view, top view and side view of a radome of a modular satellite transceiver according to one embodiment.

In the appended figures, similar components and/or features may have the same reference label. Where the reference label is used in the specification, the description is applicable to any one of the similar components having the same reference label.

DETAILED DESCRIPTION OF THE INVENTION

The ensuing description provides embodiments only, and is not intended to limit the scope, applicability or configuration of the disclosure. Rather, the ensuing description of the embodiment(s) will provide those skilled in the art with an enabling description for implementing a embodiment. Various changes may be made in the function and arrangement of elements without departing from the spirit and scope as set forth in the appended claims.

A modular satellite transceiver is disclosed herein in various embodiments. The modular transceiver, in one embodiment, may include an RF module and a back end module, the two modules may digitally communicate with each other. For example, the back end module may provide digital data packets to the RF module to convert to analog, up convert, amplify and/or mix prior to transmission through the satellite. Moreover, the module satellite transceiver, in another embodiment, may also include a plurality of antennas. These antennas, for example, may be arranged around a central location. The RF module may be replaced with another RF module configured to operate in a different communication band. For example, a Ku band RF module may be replaced with an X band RF module without requiring any changes to the back end module.

A satellite transceiver is also disclosed that switches between various antennas to establish and maintain link with a satellite in various embodiments. For example, the transceiver may include four antennas arranged about a central location and covering a substantial portion of the sky. The transceiver, for example, may select a first antenna and monitor data received from the first antenna. If no signal is received or detected or if the signal is not strong enough to read, then the transceiver may select and monitor a second antenna. If no signal is received or detected or if the signal is not strong enough to read, then another antenna is selected, and so on. When a signal is detected, the transceiver may receive the data from the signal. In another embodiment, as the data is being received, the transceiver monitors the adjacent antenna or antennas. If a stronger signal is detected from an adjacent antenna, then the transceiver switches and receives the data from the adjacent antenna with the stronger signal. By switching between antennas in such a fashion, line of sight between the satellite and the transceiver may be maintained.

In various other embodiments disclosed herein, the switching from receiving data from a first antenna to receiving data from a second antenna is performed using a soft handoff. According to some embodiments, the data received is packetized into at least a header and data. A soft handoff may include monitoring the phase of the signal by monitoring known data sequences in the header of signals received at the first and the second antennas. During a handoff, the phase difference between the two signals may be subtracted from or added to the data received from the second antenna. In various other embodiments, more than one antenna may receive a data signals, which may be combined using any combining technique and/or algorithm, for example, maximum ratio combining, equal gain combining, ratio-squared combining and/or predetection combining.

Figure 1B:
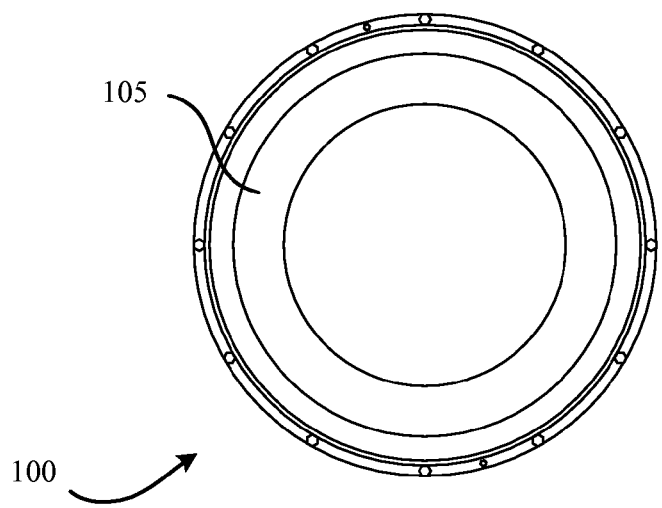
Figure 1C:
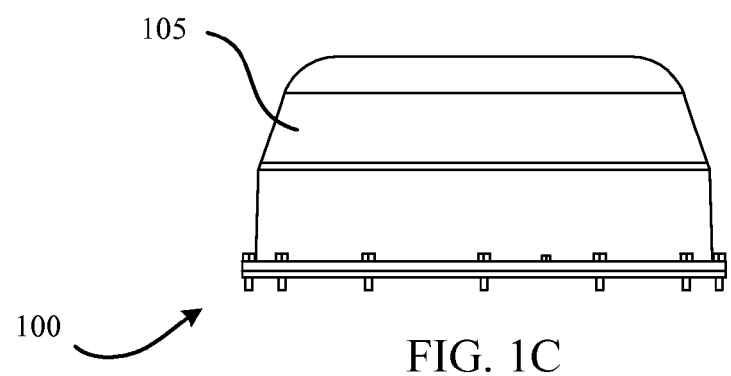

FIGS. 1A-1C show a perspective view, top view and side view of a radome of an RF module 100 of a modular satellite transceiver according to one embodiment. In some embodiments, the exterior of the RF module includes a radome 105 and/or a base plate 110. The RF module 100 may be replaced with another RF module that operates in a different band. For example, the original RF module 100 may operate in the L-Band. This RF module 100 may be replaced with another RF module 100 that operates in any other band, such as, for example, the X-Band, Ku-Band, and/or the Ka-Band. Another embodiment allows for field replacement of the RF module 100 and assemblies without replacing the backend assembly.

In some embodiments, as shown, the exterior of the RF module 100 comprises a radome 105. The radome 105 may enclose a plurality of antennas and may be coupled with a base. The radome 105 may comprise a cylinder-like shape. Other radome 105 embodiments may include multi-facet shapes, smooth sectional shapes blended together or combinations of facets and smoothly varying sections enclosing the antenna elements. In some embodiments, the modular transceiver may be used within an airborne or land based configuration. In some embodiments, the radome 105 may be less than about 8.725 inches wide by about 8.725 inches wide by about 5 inches high. In another embodiment, the dimensions of the radome 105 may be less than about 10 inches wide by 10 inches wide by 5 inches high. In yet another embodiment, the radome 105 may include a mostly cylindrical shape with a 8.275 diameter and a height of 5 inches. In another embodiment, the radome 105 height is less than about 4 inches. Various other embodiments may include a width or diameter of less than about 7, 7.5, 8, 8.5, 9.5, 10.5, and/or 11 inches as well as a height of less than about 3, 3.25, 3.5, 3.75, 4, 4.25, 4.5, 4.75, 5.25, 5.5, 5.75, or 6 inches. In yet other embodiments, the radome 105 may comprise a volume less than about 400 cubic inches. Moreover, in another embodiment, the transceiver may comprise a volume less than about 390, 380, 370, 360, 350, 340, 110, 320, 310, 305 or 300 cubic inches.

Figure 2:
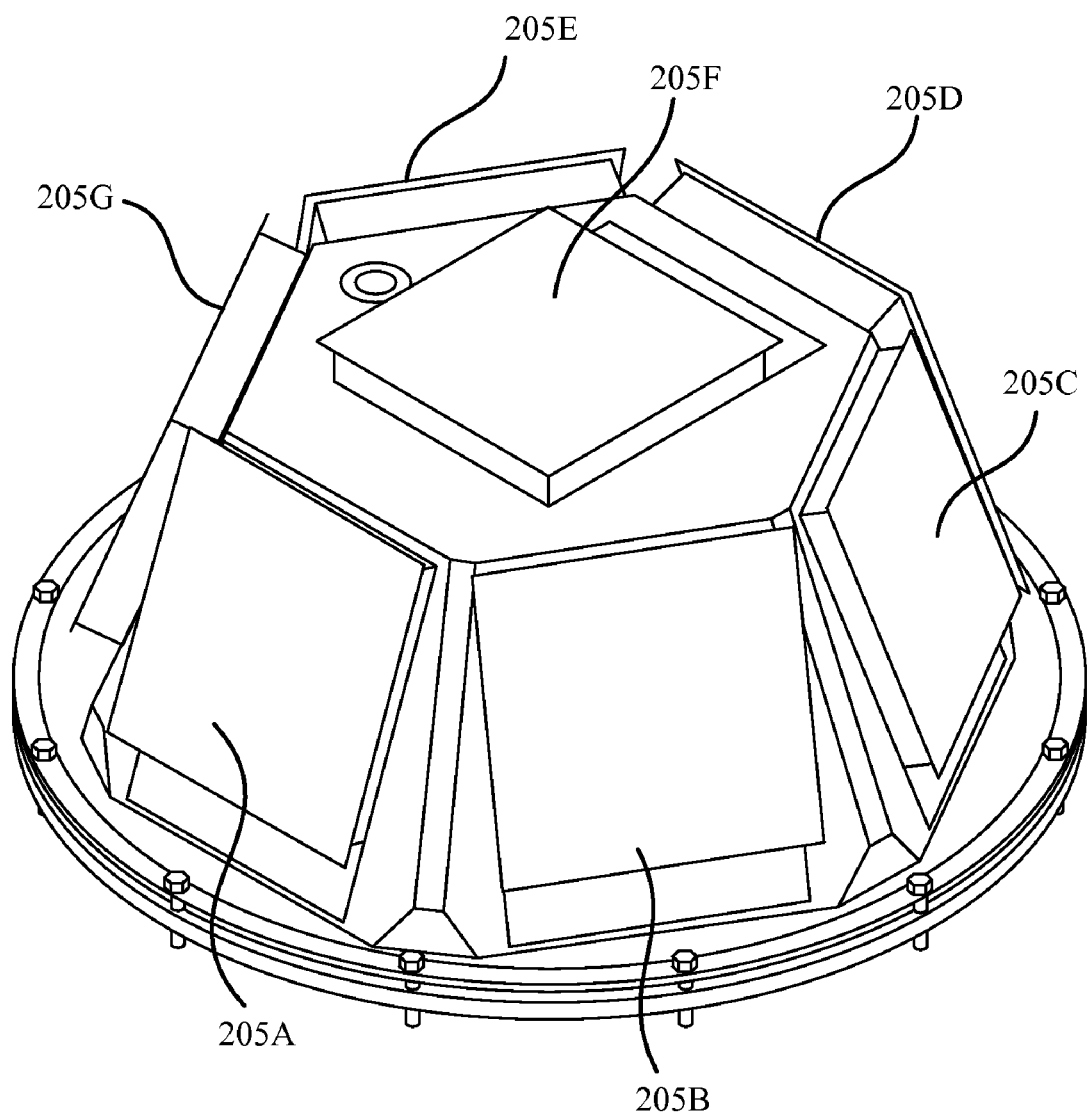
FIG. 2 shows antenna patches within a modular transceiver according to one embodiment.

FIG. 2 shows the interior of the RF module 100 with seven patch antennas 205 according to one embodiment. In some embodiments, each antenna 205 may comprise, for example, a patch antenna or another surface mounted antenna. In this example, six antennas 205A, 205B, 205C, 205D, 205E, and 205G are arrayed in a hexagonal pattern around a central antenna 205F. In one embodiment, the six side antennas may be similar antennas and the top antenna may be unique or similar. Each of the individual antennas may be modular. For example, the antennas may each be quickly replaced in the field. For example, an antenna may be replaced by removing the radome 105, unsecuring the antenna, and disconnecting the antenna.

Figure 3:
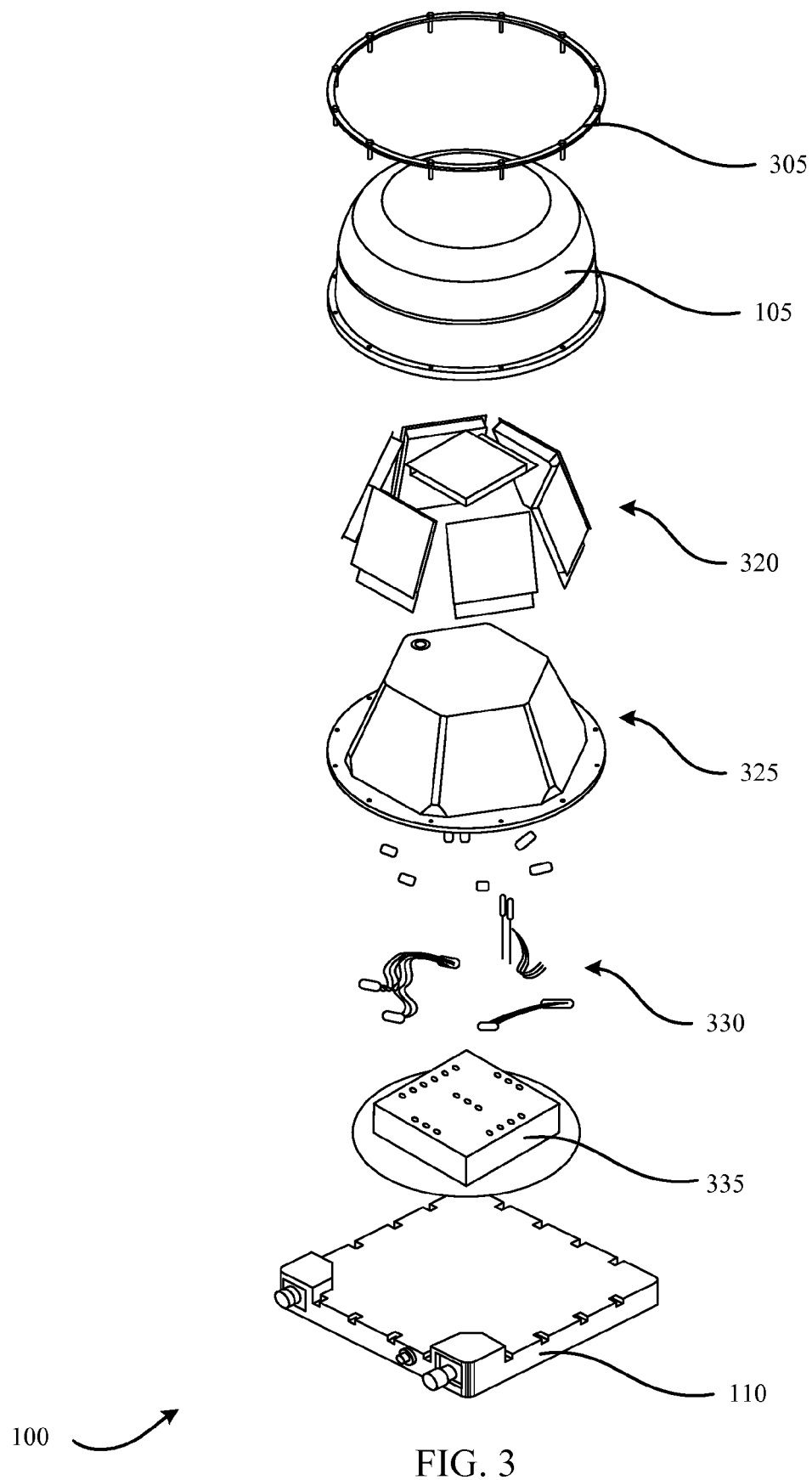
FIG. 3 shows an exploded view of a front end module of a transceiver-antenna assembly according to one embodiment.

In another embodiment of the invention, the antenna assembly, including each of the patch antennas is modular and may also be quickly replaced. FIG. 3 shows an exploded view of portions of an RF module 100 according to one embodiment. As shown in the figure, an antenna patch assembly 320 may be mounted on an antenna housing 325 that is then connected with other circuitry 335, which may include, for example, the RF front end module and the band converter module, and the bottom plate 105. A mounting ring may be used to secure the radome 105 with the base plate 110. The antenna housing 325 and bottom plate 110 may then be coupled with a backend module. Accordingly, the RF module 100 and the antennas therein may be replaced by simply replacing the independent RF module 100. This replacement may be done, for example, to replace a bad transceiver and/or antennas, for maintenance, for upgrading and/or to change the band of the RF module 100. The band may be an L-band, Ku-band, X-band, Ka-band and/or any other band. Alternatively, the transceiver may be replaced without replacing the antenna assembly.

Cables 330, such as coaxial cables, may be used to communicably connect each antenna with the front end module and/or other modules. In some embodiments, to remove the antennas, these connectors may be disconnected. In some embodiments, the RF module may be coupled with the back end module using twisted pair. Alternatively, the interconnection of signals between the antenna and transceiver assembly may be made through direct connections affixed to the respective housing such as blind-mating connector pairs or sets.

Patch antenna configurations can comprise single or multiple patch arrangements with driven and parasitic elements. Patch elements may be aperture coupled, edge driven or probe driven. Antenna elements can be single polarization with linear or circular polarization. In another embodiment, a dual-circular polarization patch element having a driven patch and a parasitic patch where a quadrature (90°) hybrid circuit is incorporated into a first patch printed circuit board (PCB) assembly for enabling dual circular polarization states. The driven patch PCB assembly is attached to a housing 325. A parasitic patch is carried by a substrate in the preferred embodiment and the substrate is supported above the driven patch by a dielectric spacer.

The transceiver may be attached to a vehicle, for example, such as a military vehicle, a boat, an airplane, a helicopter, a car, a jeep, a truck, a Humvee (or HMMWV), a transporter, a tank, etc., according to some embodiments. In other embodiments, the RF module 100 may be used in military applications. There could be different RF modules for different applications, which may be coupled with the same backend or modem assembly. For example, there could be a 3, 4, or 5-patch embodiment for aircraft and a 7-patch embodiment for vehicles that both use the same transceiver assemblies. An RF module 100 comprised of a 5-patch embodiment having 4 side-oriented patches and one upward oriented patch can be operated in a similar manner as in the 7-patch embodiment. Any number of patch antennas may be used, for example, 1, 2, 3, 4, 5, 6, 7, 8, 9, 10, 11, 12, 13, or more patch antennas may be used.

In another embodiment, the present disclosure provides for a transceiver comprising more than one antenna group. The antenna groups may include at least one antenna and each group may be configured to transmit and receive a signal using a single antenna within the antenna group. For example, the transceiver may include a first antenna group with three antennas, a second antenna group with three antennas, and a third antenna group with the central antenna. Thus a group may switch between antennas and send a single signal from the antenna group. The transceiver may also provide 360° azimuth coverage. The transceiver may also provide at least about 5° to about 90° elevation coverage. The elevation coverage provided by the transceiver may range from about 6°, 7°, 8°, 9°, 10°, 15°, 20°, 25°, or 30° up to about 90°.

Antennas arrayed in such a configuration may provide, for example, 360° azimuth coverage. Moreover, the antennas may provide, for example, 5° to 90° elevation coverage. As another example, the antennas may provide greater than 6°, 7°, 8°, 9°, 10°, 15°, 20°, 25°, or 30° elevation coverage. Other embodiments of the invention may provide for example, three, four, five, seven, eight, or nine patch antennas arrayed around a central antenna. Antennas can be grouped in sub-arrays where the signal processing within the sub-array group can be different from the processing among the groups. For example, the elements within the group can be phase scanned or steered whereas the groups are subsequently switched and/or combined through signal processing. Those skilled in the art will recognize further configurations of other combinations of antennas and various signal processing configurations may be included.

Figure 10:
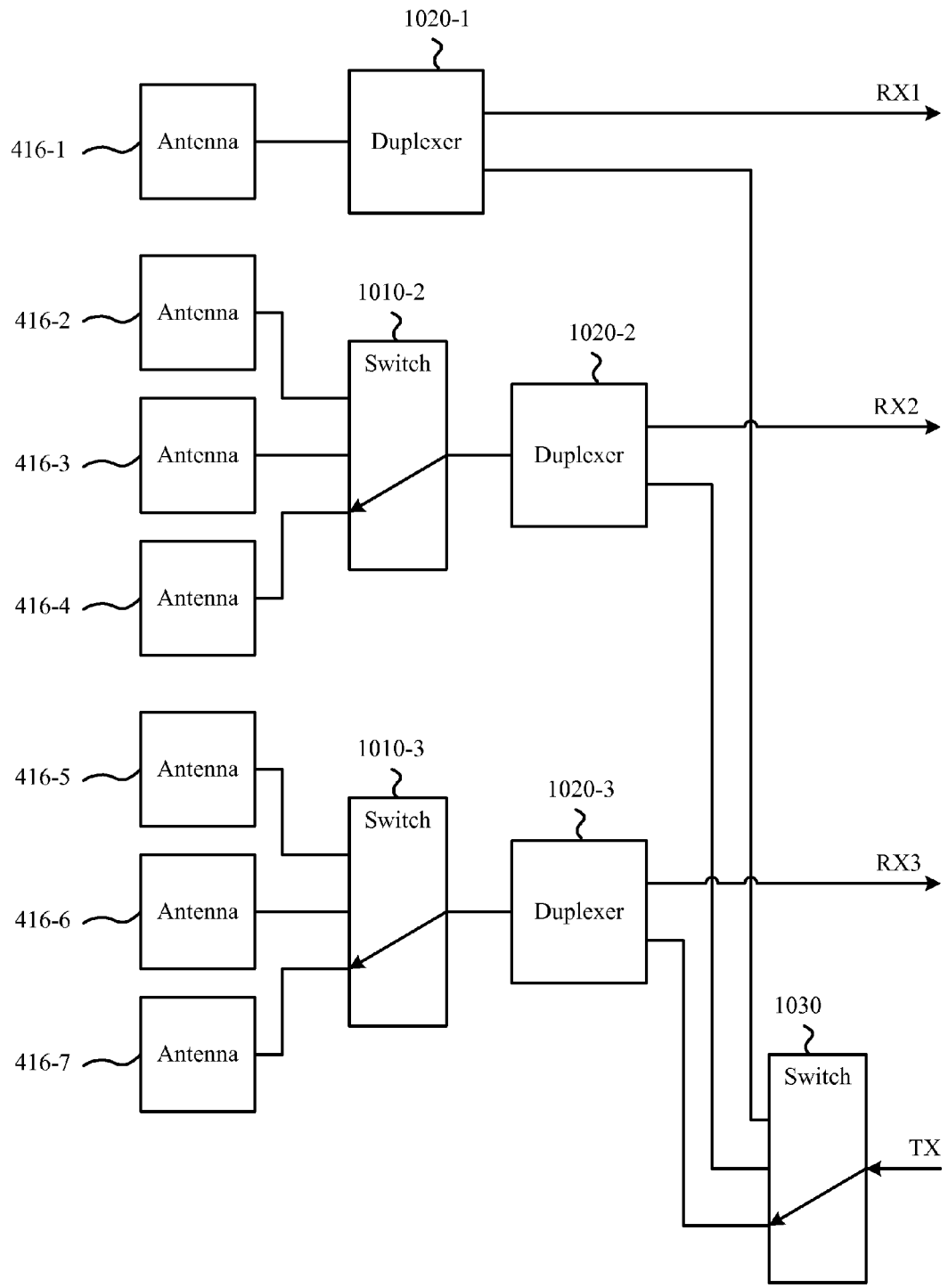
FIG. 10 shows a block diagram showing transmission and reception of a signal using multiple antennas according to one embodiment.

As shown in FIG. 10 the hardware may provide three independent RF channels. Each path may be coupled with an antenna or an antenna group. In some embodiments, the second and third groups may provide an RF channel from every other antenna patch. In another embodiment, antenna time share may be employed to determine the best line of sight to a satellite or other communication point. Moreover, in some embodiments, the signals may comprise spread spectrum signals.

The multiple paths may also be used to combine the beams in a MIMO configuration or in an array for beam-forming applications. Each individual antenna patch may also beam-form. The beams may also be combined to provide signal diversity. The antennas may also transmit at various different polarizations as well as receive at different polarizations. In yet another embodiment, the antennas may be configured to provide beam forming for one application and the switch between beams for a second application.

Figure 4:
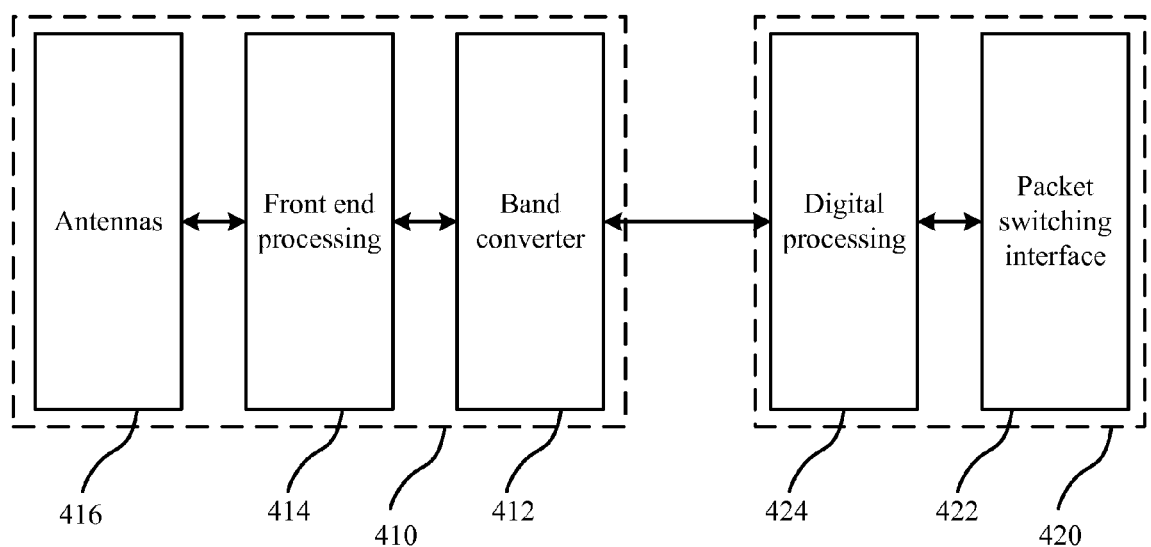
FIG. 4 shows a block diagram showing an RF module and a back end module according to another embodiment.

FIG. 4 shows a block diagram showing an RF module 410 and a back end module 420 according to another embodiment. As shown, the RF module 410, in some embodiments, includes one or more antennas 416, front end processing module 414, and a band converter 412. The backend module 420, for example, may include a packet switching interface 422 and a digital processor 424. The RF module 410, in various embodiments, may include analog-to-digital converters, digital-to-analog converters, amplifiers, low noise amplifiers, up conversion, down conversion, generation of mixing frequency, and/or oscillation (see FIG. 16). The backend module may include IP protocol functions, tracking loops, power conditioning, modulation, demodulation, IP header compression, encryption and/or decryption. In yet other embodiments, the RF module 410 may largely perform analog functions and the backend module 420 may largely perform digital functions.

Figure 5:
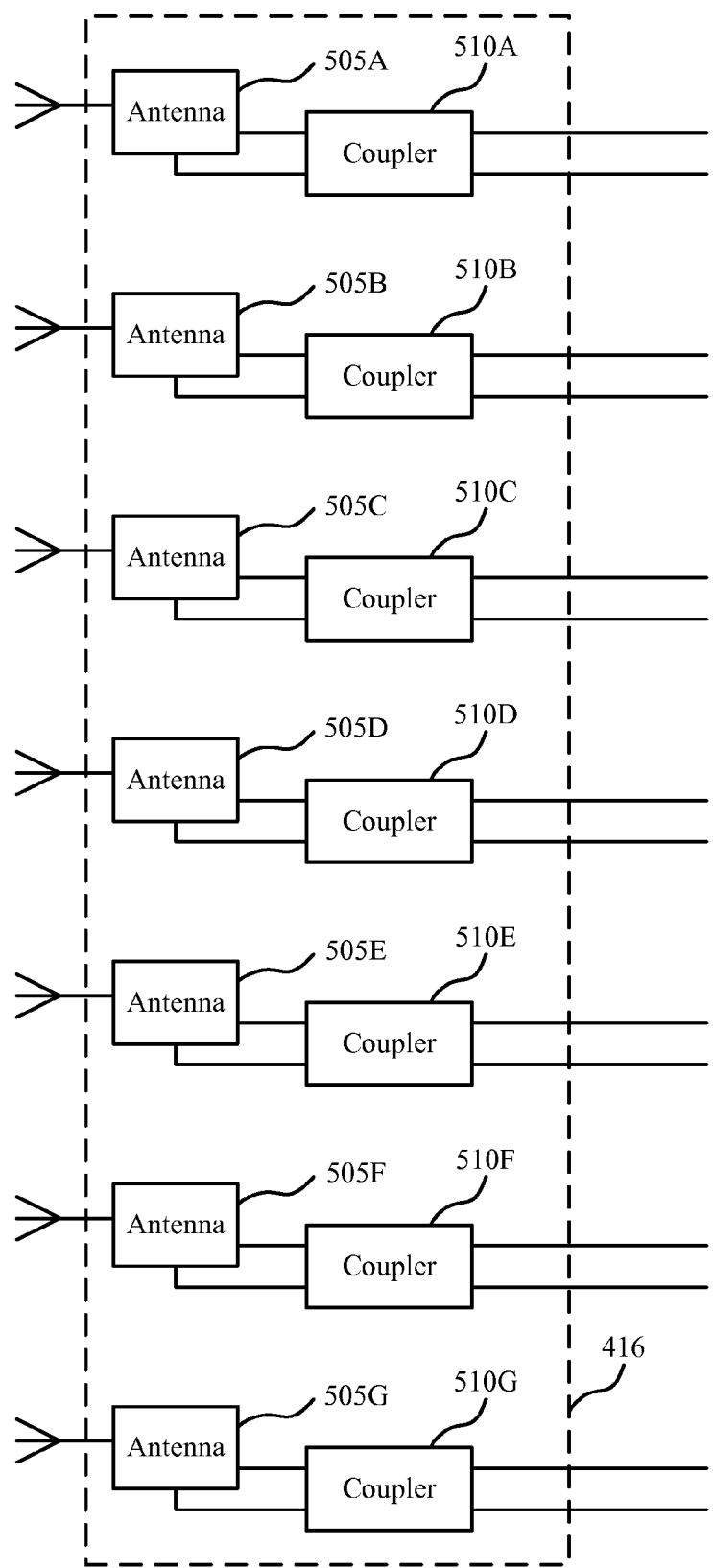
FIG. 5 shows a block diagram of an antenna module with a plurality of antennas according to one embodiment.

FIG. 5 shows a block diagram of an antenna module 416 with a plurality of antennas 505 according to one embodiment. In this embodiment, seven antennas 505 are shown with seven branch line couplers 510. The branch line couplers 510 allow for polarization selectivity. The antennas 505 for each antenna module 416 may be selected based on the frequency band of the RF module 410. Thus, if an RF module was configured to communicate using the Ku band, then the antennas will be selected to operate within the Ku band. Thus the antennas 505 are matched with the up and down converters. Various other bands may be used.

Figure 6A:
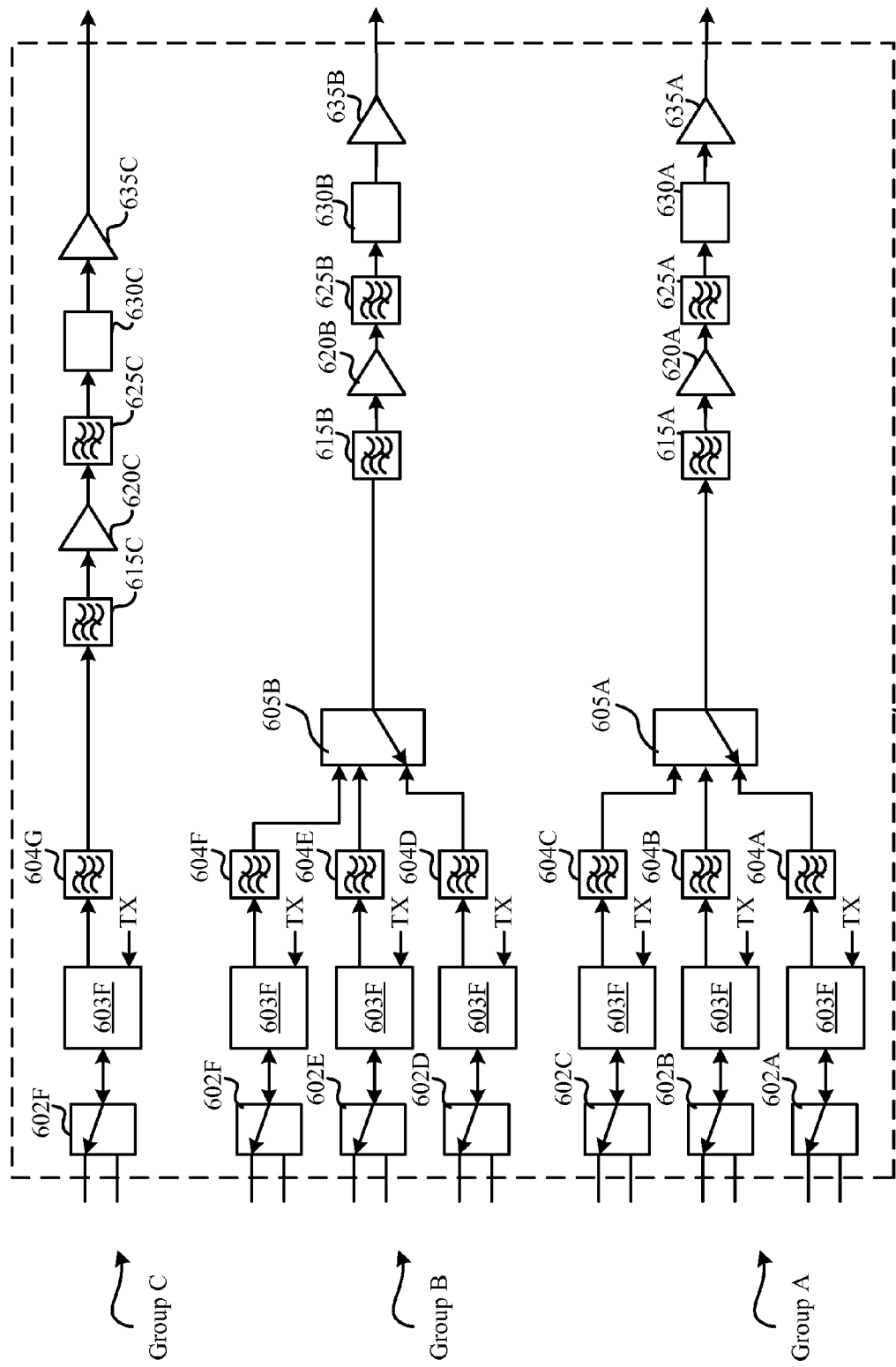
FIGS. 6A-6B shows a block diagram of an RF front end module according to one embodiment.

FIG. 6A shows a block diagram of an RF module 414 according to one embodiment. The RF module may be coupled with the antenna module 416. As shown the RF module 414 may include duplexers 603 that provide duplexing functions for the transmit and receive signals. In some embodiments, a nonreflective polarization switch 602, for example, may be used to switch between left-hand and righthand cross polarized signals to the antenna module. On the receive line a filter 604, such as a low pass filter, may be used. A switch 605 may be used to select between antennas within an antenna group for receiving a single. For example, the embodiment shown in the figure includes 3 antenna groups, from bottom to top Group A, Group B and Group C. In this example, Group C includes a single antenna, such as, a central antenna. Group A and Group B, for example, each include three antennas. Any number of groups with any number of antennas may be used. Various filters 655, 665 and an amplifier 660 may also be included. Each receive line may also include various amplifiers 635, 620, filters 615, 625 and/or limiters 630 as shown in FIG. 6. Various other components may be included.

Figure 6B:
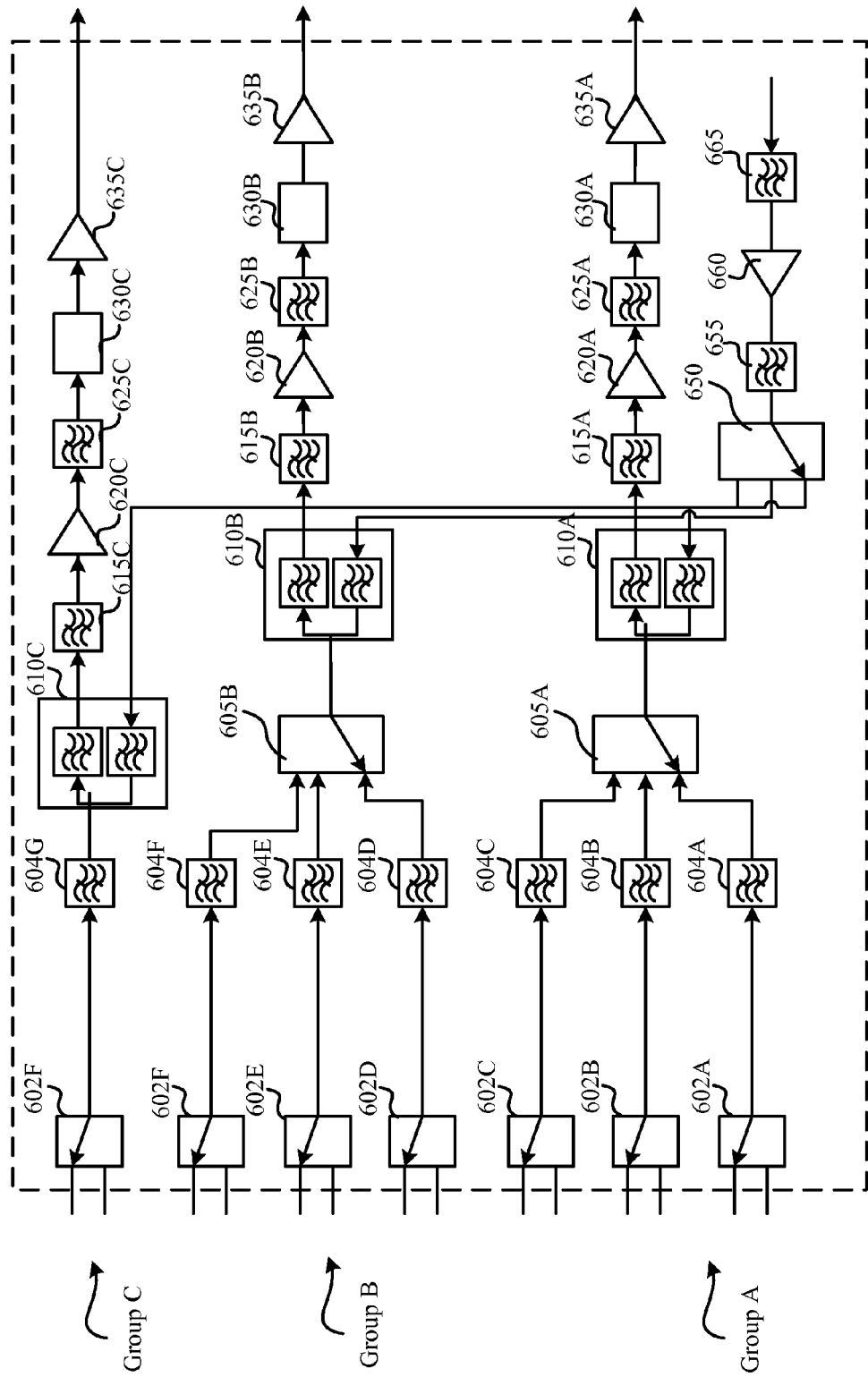

FIG. 6B is similar to FIG. 6A, except the transmit duplexing occurs on a group by group basis instead of an antenna by antenna basis. Accordingly, a single group may be selected to transmit a signal. Thus, a switch 650 is included that switches the transmit signal between the three groups.

Figure 7A:
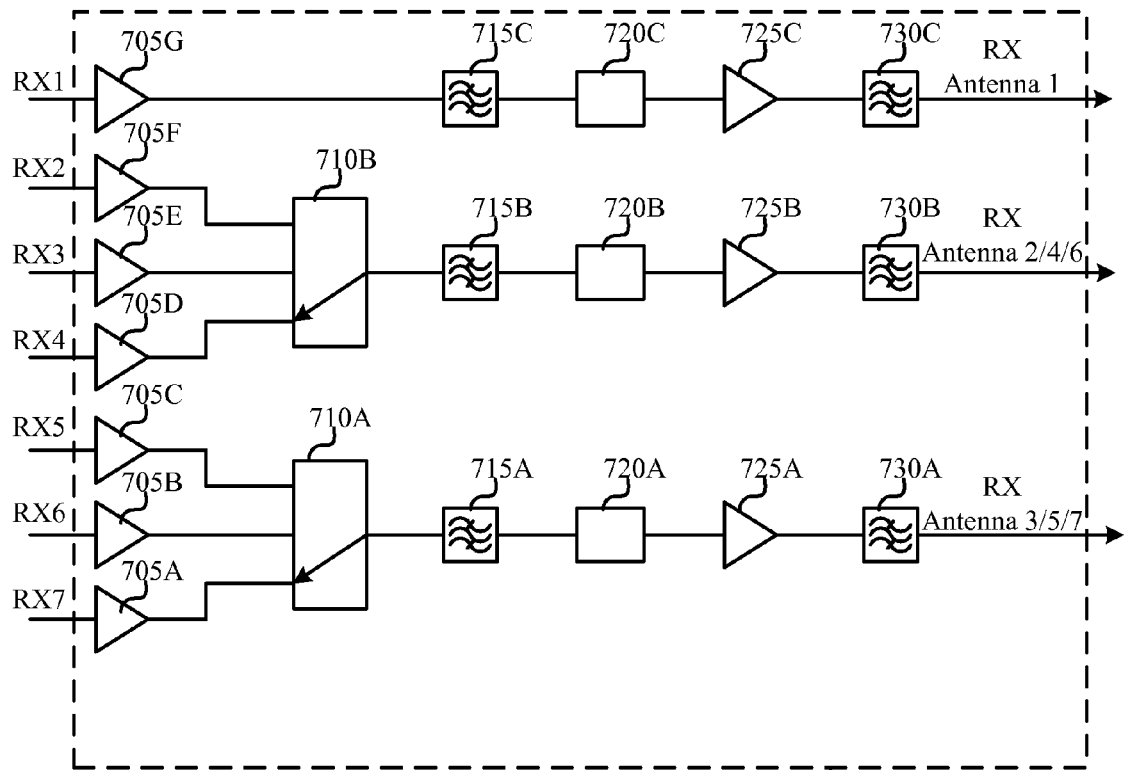
FIG. 7A shows a block diagram of receiver components of another RF front end module according to one embodiment.

FIG. 7A shows a block diagram of receiver components of another RF front end module 414 according to one embodiment. In this embodiment, each line from an antenna includes an amplifier 705. Antenna groups A and B also include a three way switch 710 that selects from the seven antennas or a group of antennas or an antenna within a specific group. An antenna group may include any number of antennas. Therefore, the switch 710, in some embodiments, may include any number of ports. Various filters 715 and 730, for example, band pass filters, may be included along with limiters 720 and amplifiers 725. Those skilled in the art will recognize that other processes and/or components may be used within the RF front end module 414. Moreover, various processes and/or components may be removed.

Figure 7B:
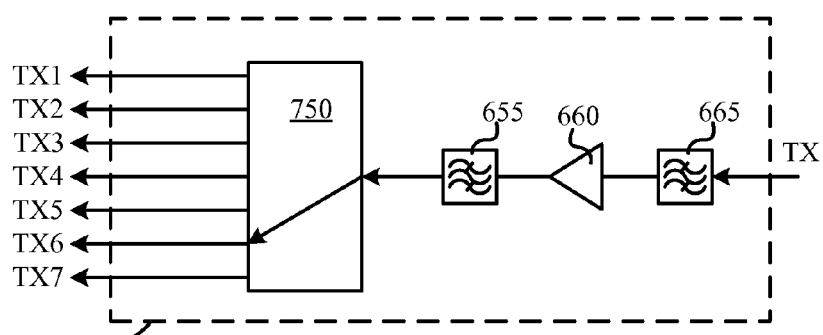
FIG. 7B shows a block diagram of transmitter components of another RF front end module according to one embodiment.

FIG. 7B shows a block diagram of transmitter components of another RF front end module 414 according to one embodiment. The transmitter components may include for example, filters 655 and 665, amplifiers 660, and/or a switch 750 with various output ports that lead toward the antenna. Thus, during transmission, the best antenna may be used for transmission.

Figure 8:
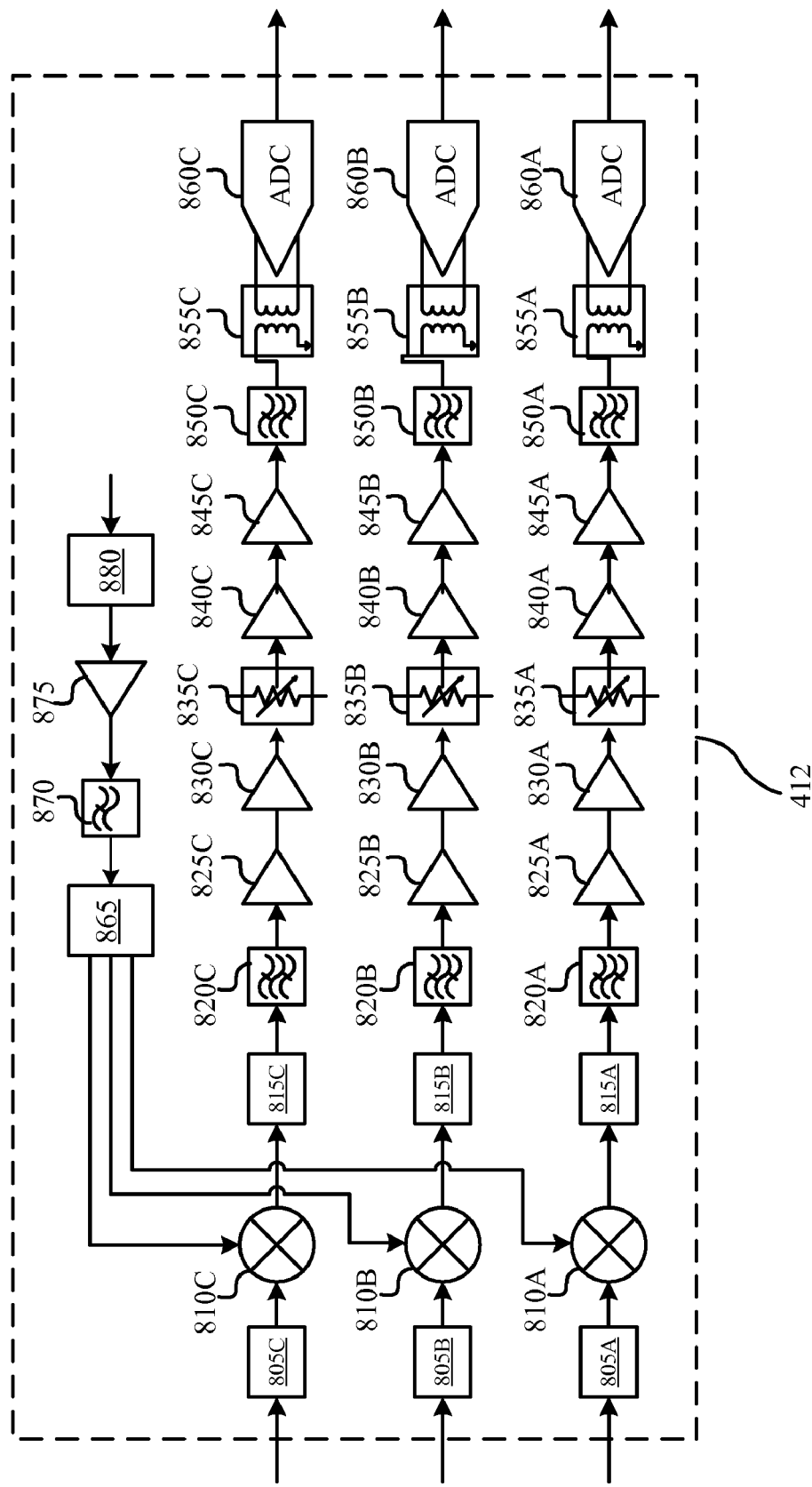
FIG. 8 shows a block diagram of receiver components of a band converter module according to one embodiment.

FIG. 8 shows a block diagram of receiver components of a band converter module 412 according to one embodiment. In some embodiments, this portion of the band converter provides down conversion for the receive line and up conversion for the transmit line. In some embodiments, the band converter module 412 provides down conversion of the signal received from the RF front end 414 and provides digital signal to a backend module 420. In other embodiments, the band converter module 412 provides a digital-to-analog processing and up conversion for digital signals received from the back end module. Depending on the band selected for communication with a satellite, the band convert module 412 up converts and/or down converts a signal with the band of the RF module. Various amplifiers 825, 830, 840, and 845, limiters 805 and 815, rectifiers 855, and filters 820 and 850 may be used. Moreover, analog-to-digital converters 860 convert the analog signal into a digital format. Mixers 810 are included to decode and/or demodulate the analog data from the carrier signal. The carrier signal is provided by the synthesizer 880. Various other optional components are shown coupled with the synthesizer 880, such as a power divider 865, a filter(s) 870, amplifier(s) 875, etc.

Figure 9:
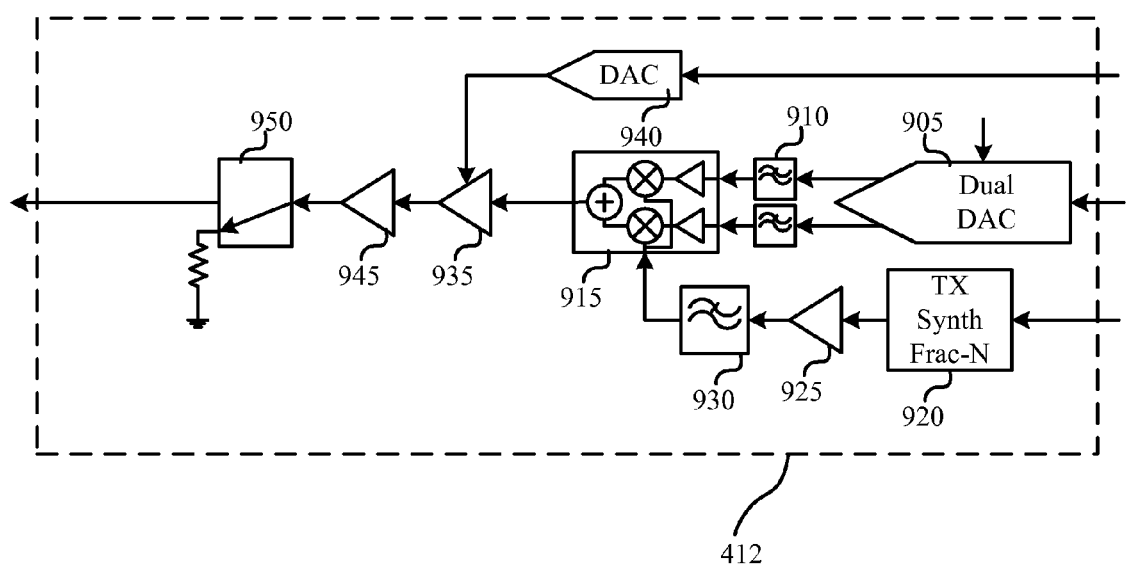
FIG. 9 shows a block diagram of transmitter components of a band converter module according to one embodiment.

FIG. 9 shows a block diagram of transmitter components of a band converter module 412 according to one embodiment. A digital-to-analog converter (DAC) 905 is shown along with a modulator 915, filters 930 and 910, amplifiers 925 and 945, a variable gain amplifier 935, and an isolation circuit 950, and an associated DAC 940. Digital data may be received at the DAC 905. A modulator may then up convert the analog signal to the band being used within the RF module. The carrier signal is provided by the synthesizer 920. While various components are shown within this embodiment of a band converter, in other embodiments, various other components or combinations may be used. Moreover, in other embodiments, components may be left our or rearranged.

FIG. 10 shows a block diagram showing reception of a signal using multiple antennas according to one embodiment. As shown, seven antennas 416 are grouped within three groups. Group 1 includes antenna 416-1. Group 2 includes antennas 416-2, 416-3, and 416-4. Group 3 includes antennas 416-5, 416-6 and 416-7. Groups 2 and 3 include a switch 1010 that selects which antennas are being used to transmit or receive data. Each group also includes a duplexer 1020 that may be tied to the specific operational band of the RF module. From the duplexer three receive channels are provided. Only one transmit channel is provided from a transmission switch 1030. Thus, using the three receive channels, the system may detect the best antenna to communicate with a satellite. This best antenna may then be used to transmit the data. On the receive side, data may be received by combining the signal from three antennas, or looking only at the signal from the best antenna. As the transceiver moves and/or rotates, the best antenna may change.

Figure 11:
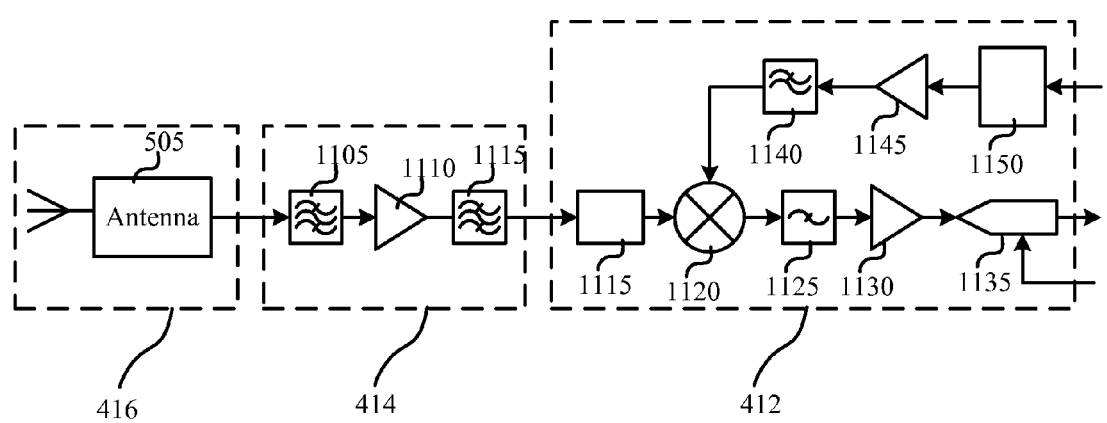
FIG. 11 shows an RF module with an antenna module, front end module, and a band conversion module according to one embodiment.

FIG. 11 shows the reception side of an RF module with an antenna module 416, front end module 414, and a band conversion module 412 according to one embodiment. The antenna module 416 includes one or more antennas 505. In this embodiment, a single antenna 505 is used. The front end module 414, includes two filters 1105, 1115 and an amplifier 1110. The band conversion module 416 includes a limiter 1115, and a mixer 1120 that may decode the analog data from the carrier signal. The carrier signal is provided by the synthesizer 1150. Various filters 1140 and 1125 may also be used, as well as amplifiers 1130, 1145. Finally, the band conversion module also includes an analog-to-digital converter 1135 that converts the analog data into digital data.

Figure 12:
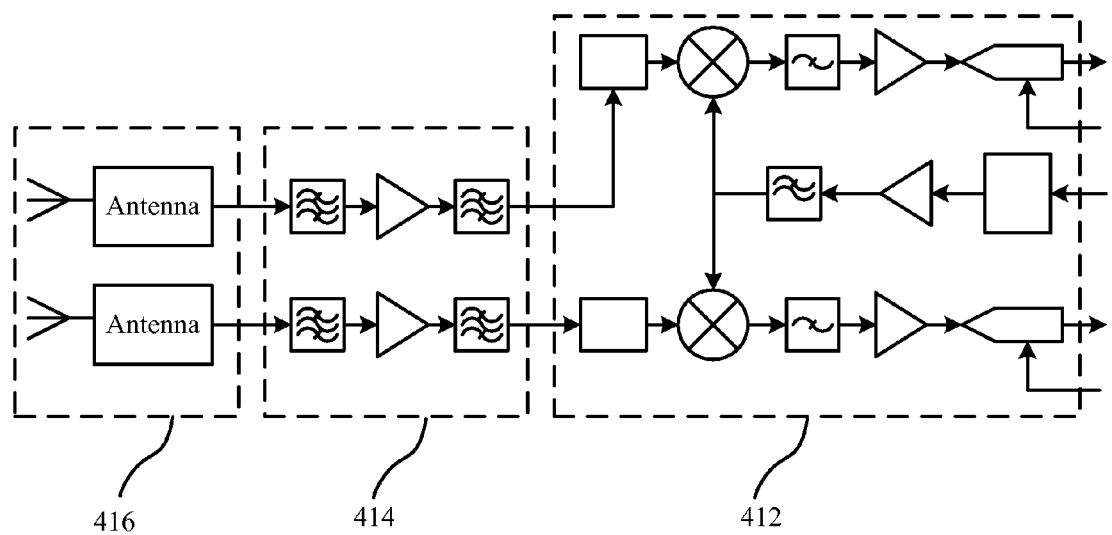
FIG. 12 shows an RF module with an antenna module, front end module, and a band conversion module according to one embodiment.

FIG. 12 shows the reception side of an RF module for receiving data with an antenna module 416, front end module 414, and a band conversion module 412 according to one embodiment. The antenna module 416 according to this embodiment includes two antennas and provides two receive channels to a back end module.

Figure 13:
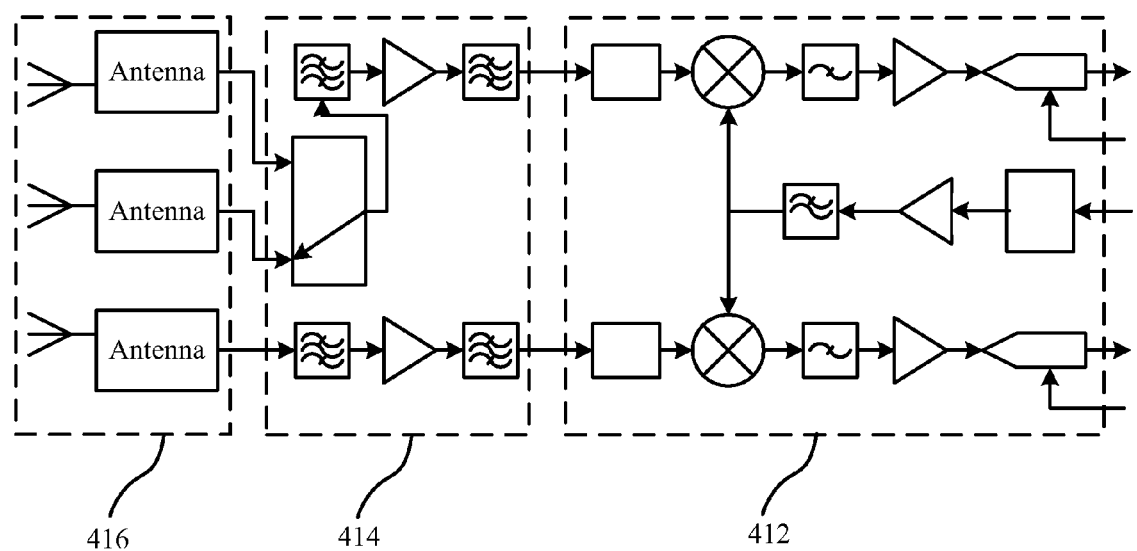
FIG. 13 shows an RF module with an antenna module, front end module, and a band conversion module according to one embodiment.

FIG. 13 shows the reception side of an RF module for receiving data with an antenna module 416, front end module 414, and a band conversion module 412 according to one embodiment. The antenna module 416 includes three antennas and the front end module 414 includes a switch that selects one of two antennas for transmission and/or reception. In some embodiments, the back end module controls the functionality of the switch, deciding which antenna to transmit and/or receive data. A second transmission switch may also be included that selects between all three antennas for data transmission.

Figure 14:
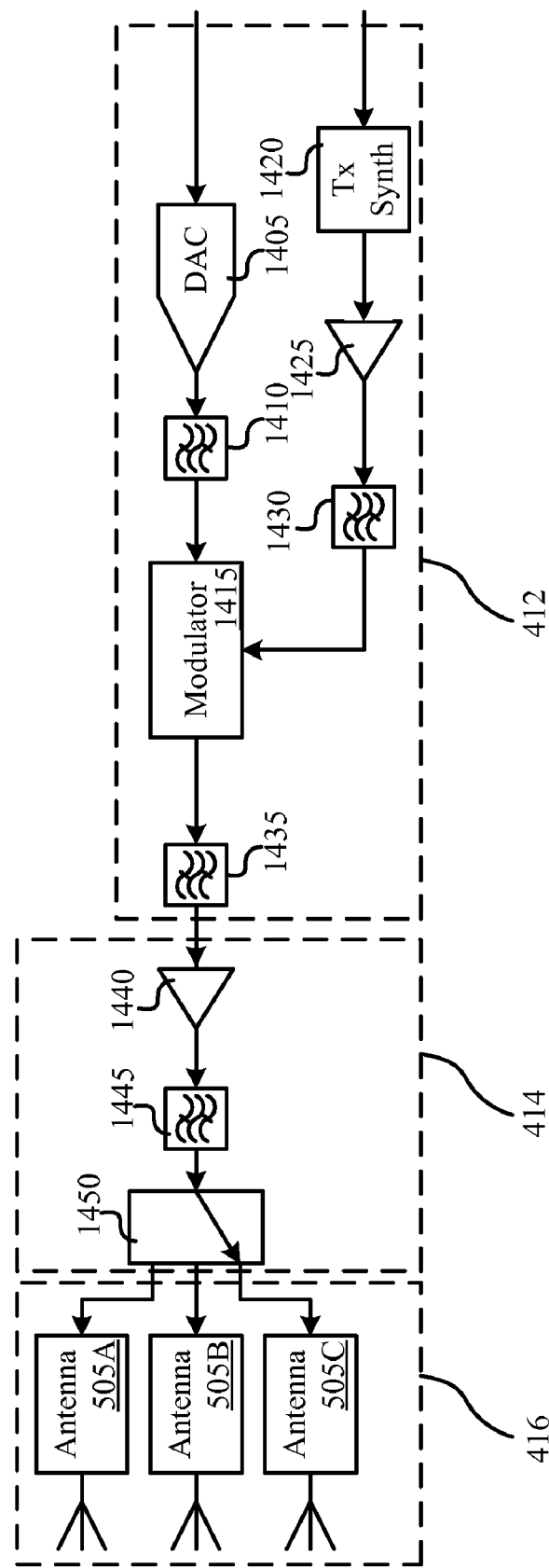
FIG. 14 shows an RF module with an antenna module, front end module, and a band conversion module according to one embodiment.

FIG. 14 shows the transmit side of an RF module for transmitting data with an antenna module 416, front end module 414, and a band conversion module 412 according to one embodiment. Three antennas 505 are shown in the antenna module 416. The front end module 414 includes a switch 1450 that selects which antenna 505 the data will be transmitted from. A filter 1445 and an amplifier 1440 may also be included in the front end module 414. The band conversion module 412 includes a digital-to-analog converter (DAC) 1405 and a modulator 1415 that combines a carrier signal with the data signal. The carrier signal may be provided by a synthesizer 1420. Various filters 1430, 1435, 1410 may be included, as well as an amplifier 1425.

Figure 15:
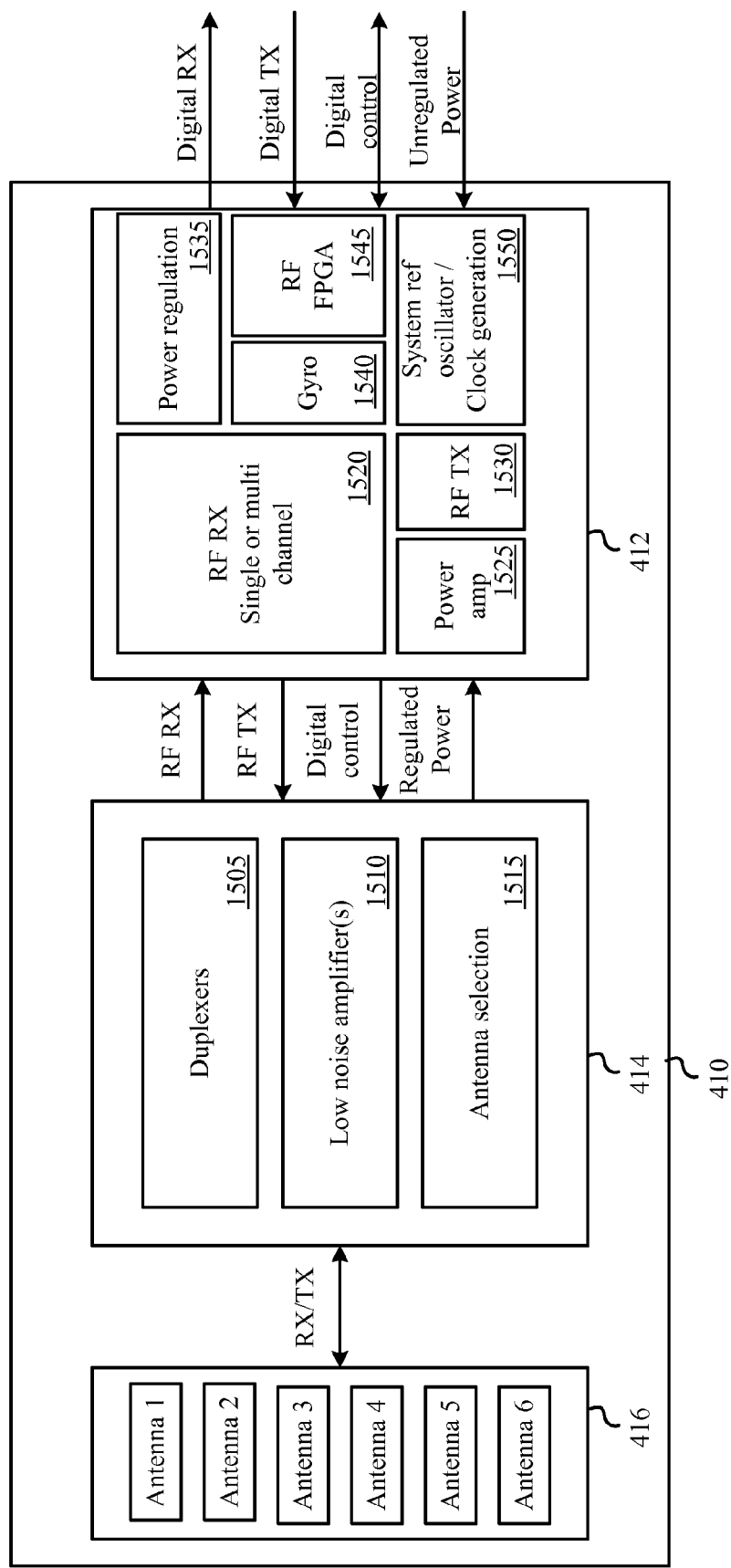
FIG. 15 shows another block diagram of an RF module with an antenna module, front end module, and a band conversion module according to one embodiment.

FIG. 15 shows another block diagram of an RF module 410 with an antenna module 416, front end module 414, and a band conversion module 412 according to one embodiment. The antenna module 416 includes one or more antennas and is in communication with the front end module 414. Analog transmit and receive data is passed between the two modules on one channel. The front end module 414 includes duplexers 1505, amplifiers 1510 and an antenna selection module 1515. The front end module, in some embodiments, may combine and/or separate transmit and receive signals, provide signal amplification, and/or provide antenna selection. The front end module 414 sends and receives analog receive and transmit data with the band conversion module 412 as well as receives regulated power therefrom. The band conversion module 412 includes, for example, a power regulation module 1535, a gyro 1540 or gps, power amplifiers 1525, an RF transmit module 1530, a single or multi channel RF receive module 1520, and/or system reference oscillator or clock 1550. The band conversion module, in some embodiments, may provide up and down conversion functions, digital-to-analog conversions, analog-to-digital conversions, power amplification, and/or power regulation. The band conversion module 412, in some embodiments, receives and transmits digital data with the back end module, receives unregulated power and/or digital control signals. While components and/or modules are shown as divided between various modules, these components and/or modules may be in the same module or in different modules from what is shown here.

Figure 16:
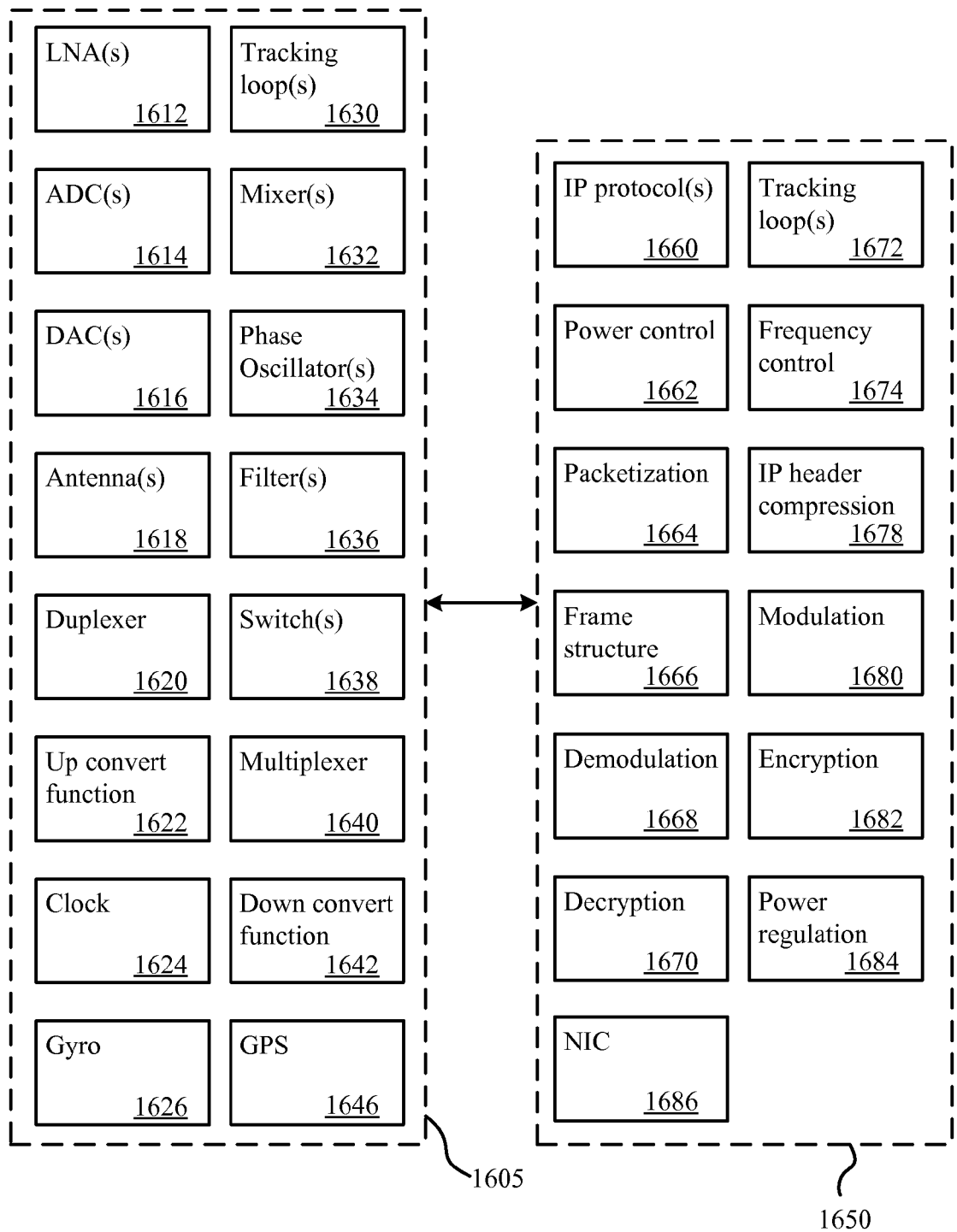
FIG. 16 shows a block diagram showing examples of components in an RF module and a back end module according to various embodiments.

FIG. 16 shows a block diagram showing examples of components in an RF module 1605 and a back end module 1650 according to various embodiments. The RF module 1605, for example, may include any or all of the following in any combination. Components such as, for example, low noise amplifiers 1612, antennas 1618, duplexers 1620, filters 1636, multiplexers 1640, switches 1638, clocks 1624, gyroscopes 1626 and/or GPS devices 1646 may be included. Analog-to-digital (ADC) and digital-to-analog (DAC) modules 1614, 1616 may be used to digitize and un-digitize data. Up and down conversion 1622, 1642 may also occur within the RF module 1605. Mixers 1632, power control 1662, phase oscillators 1634 and/or tracking loops 1630 may be included in some embodiments. In some embodiments, the gyro could be found within the back end module. In some embodiments, portions of the gyro and/or GPS circuitry may be located within the RF module 1605 and the back end module 1650.

An IP protocol module 1660 may be included in the back end module 1650 to prepare digital data packets according to the IP protocol. Packetization 1664, frame structure creation 1666 and/or IP header compression 1678 may also occur within the back end module 1650. Decryption 1670 and/or encryption 1682 of data may also occur, in some embodiments, within the back end module. Digital modulation 1680 and demodulation 1668, in some embodiments, may also occur within the back end module 1650. Frequency control 1674 and/or tracking loops for finding and/or tracking satellites 1672, in some embodiments, may also occur within the back end module. The back end module 165084 1684 may also provide regulated power 1684 as well as accesses to a network through a network interface card (NIC) 1686.

Figure 17:
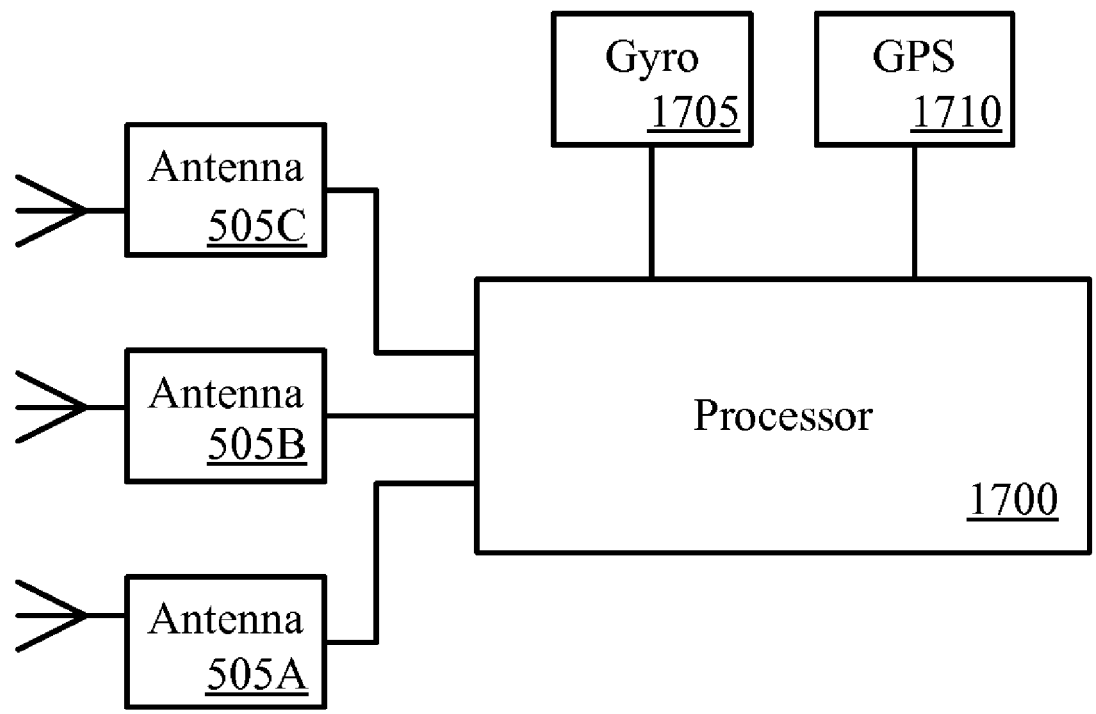
FIG. 17 shows a block diagram of a signal tracking system according to one embodiment.

FIG. 17 shows a block diagram of a signal tracking system according to one embodiment. The signal tracking system may include a plurality of antennas 505 that are used to track a satellite or satellites. The processor 1700 finds the best antenna for both transmission and reception of data from the satellite. A gyroscope 1705 and/or a GPS device 1710 may be used to aide in antenna tracking. The processor, in some embodiments, may be located within a back end module.

Figure 18:
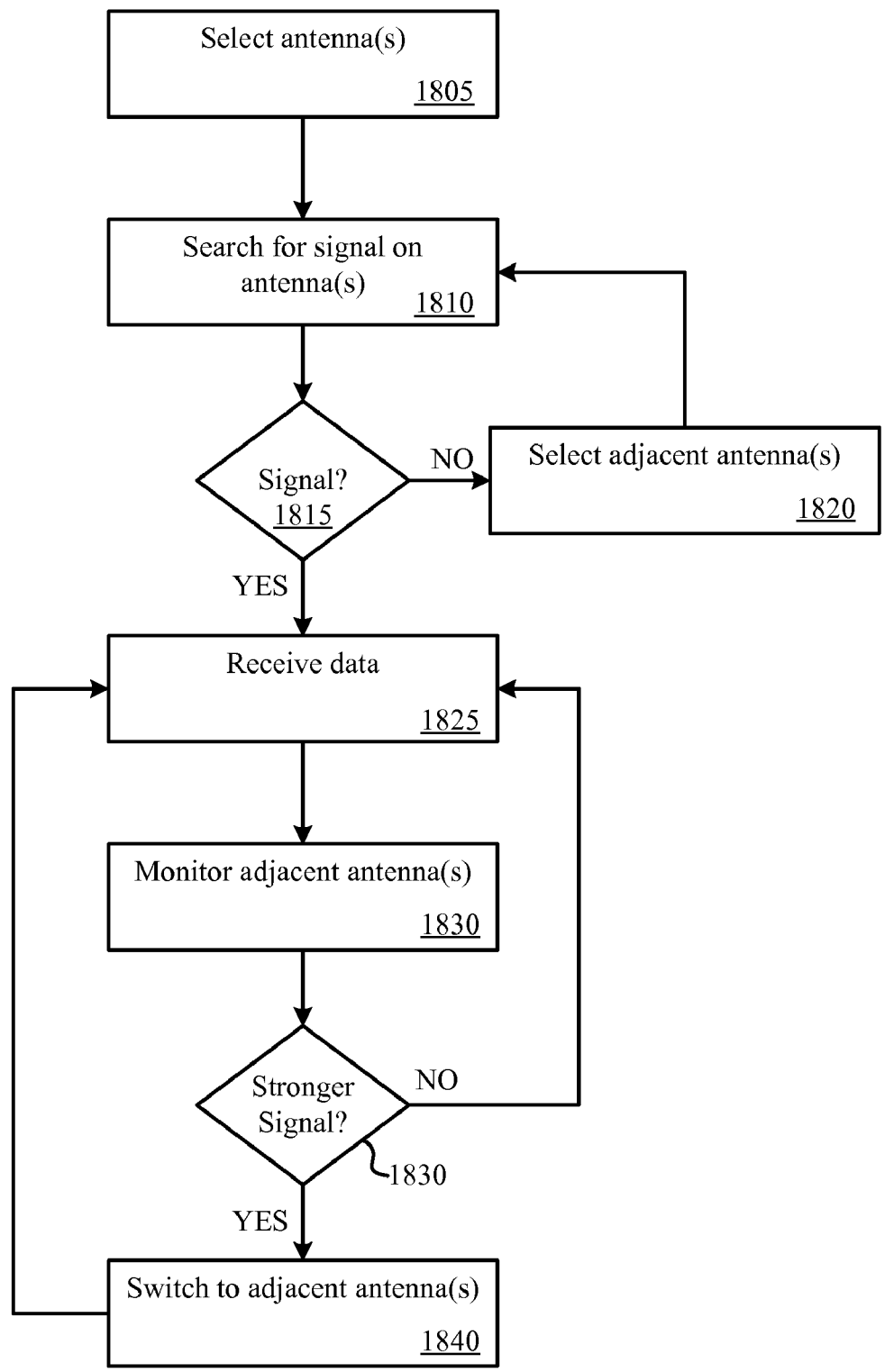
FIG. 18 shows a flowchart of a method for tracking a satellite using multiple antennas according to one embodiment.

FIG. 18 shows a flowchart of a method for tracking a satellite using multiple antennas according to one embodiment. An antenna is selected from the group of available antennas at block 1805. For example, the most recently used antenna may be chosen. As another example, a random antenna may be selected. In other embodiments, antenna groups may be selected rather than single antennas. Moreover, in some embodiments, three antenna groups may be receiving data. In such embodiments, an antenna within an antenna group is selected or a different antenna group may be selected. Turning back to FIG. 10, for example, antenna 416-6 may be selected.

Returning to FIG. 18, the system searches for a signal on the antenna at block 1810. If no signal is found, as determined at block 1815, then an adjacent antenna or another antenna group may be selected at block 1820. For example, turning back to FIG. 10, antenna 416-7 may then be selected. If a signal is found on the antenna, as determined at block 1815 of FIG. 18, data may then be received using this antenna at block 1825. Meanwhile, the system may monitor the signal strength of an adjacent antenna at block 1830 and determines if the adjacent antenna has a stronger signal at block 1830. In some embodiments, the system monitors and compares the signal-to-noise ratio of the two signals. If the second signal is stronger, then the system switches to the adjacent antenna at block 1840 and continues to receive data at block 1825. An adjacent antenna may be an antenna within the same group or within a different group. Otherwise the system continues to receive data at block 1825.

Figure 19:
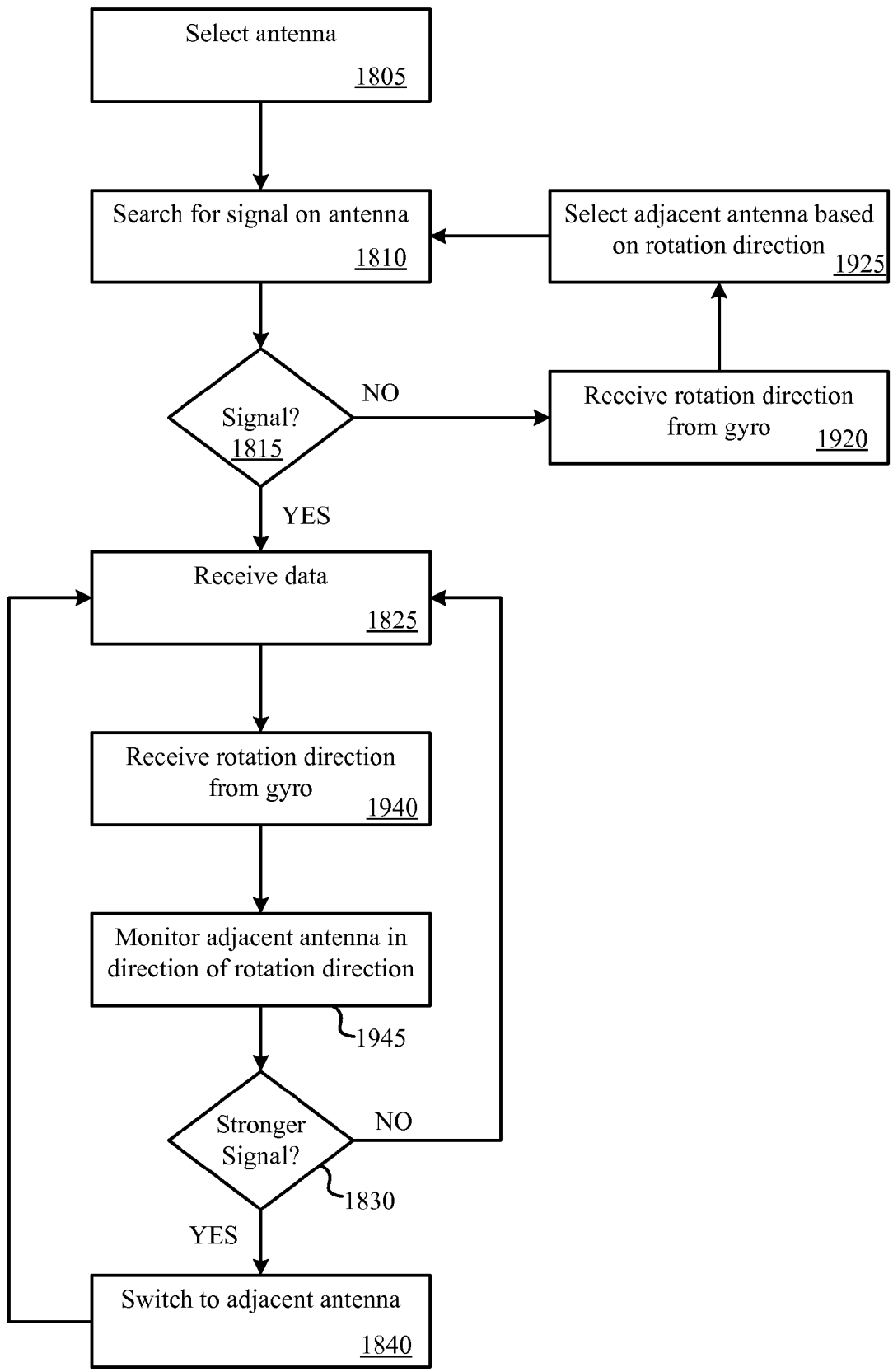
FIG. 19 shows another flowchart of a method for tracking satellites using multiple antennas and a gyroscopic element according to one embodiment.

FIG. 19 shows another flowchart of a method for tracking satellites using multiple antennas and a gyroscopic element according to one embodiment. This flowchart is similar to the one shown in FIG. 18. However, in this embodiment, a gyroscope or GPS may be used to determine which adjacent antenna to switch to. For example, if the transceiver is mounted to an automobile that is turning in a clockwise direction, a gyroscope may determine this turning motion, and direct the system to select the antenna in the counter-clockwise direction to track the satellite. Thus, at block 1920, rotation information may be received from the gyroscope if the signal strength is not large enough as determined in block 1815. An adjacent antenna is selected based on this rotation information at block 1925. Similarly, at block 1940 the gyro may aid in determining an adjacent antenna, which may be selected for monitoring at block 1945.

Figure 20:
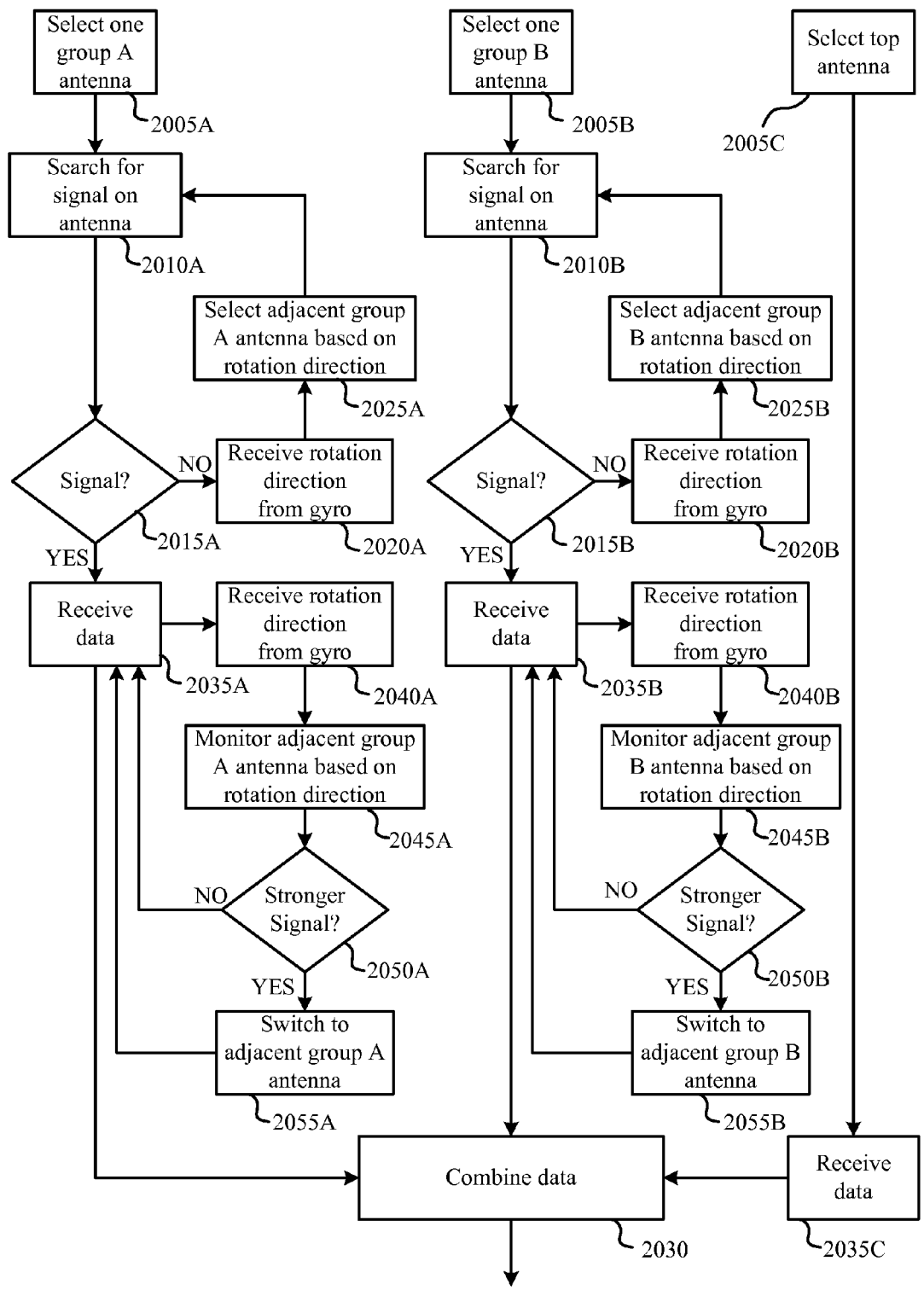
FIG. 20 shows another flowchart of a method for tracking satellites using at least three antenna groups and a gyroscopic element according to one embodiment.

FIG. 20 shows another flowchart of a method for tracking satellites using at least three antenna groups and a gyroscopic element according to one embodiment. In this embodiment, three antenna groups are monitored: group A, group B and group C. Groups A and B find the best signal within their group in a manner similar to that shown in FIG. 19. Group C, on the other hand, is a single antenna group and data is received directly from the signal antenna. Data from the three groups may be combined at block 2030 after the best antennas are selected from groups A and B. The signals may be combined, for example, using maximal-ratio combining (MRC), adaptive interference cancellation (AIC), or any other diversity technique. Equal gain combining, switched combining and/or selection combining may also be used in other embodiments. In other embodiments, rather than combining the three signals, the strongest signal from the three groups may be selected. In another embodiment, the group C antenna may be a central antenna, and the group B and group A antennas may be radially located antennas. The groups may include, for example, even and odd antennas.

Figure 21:
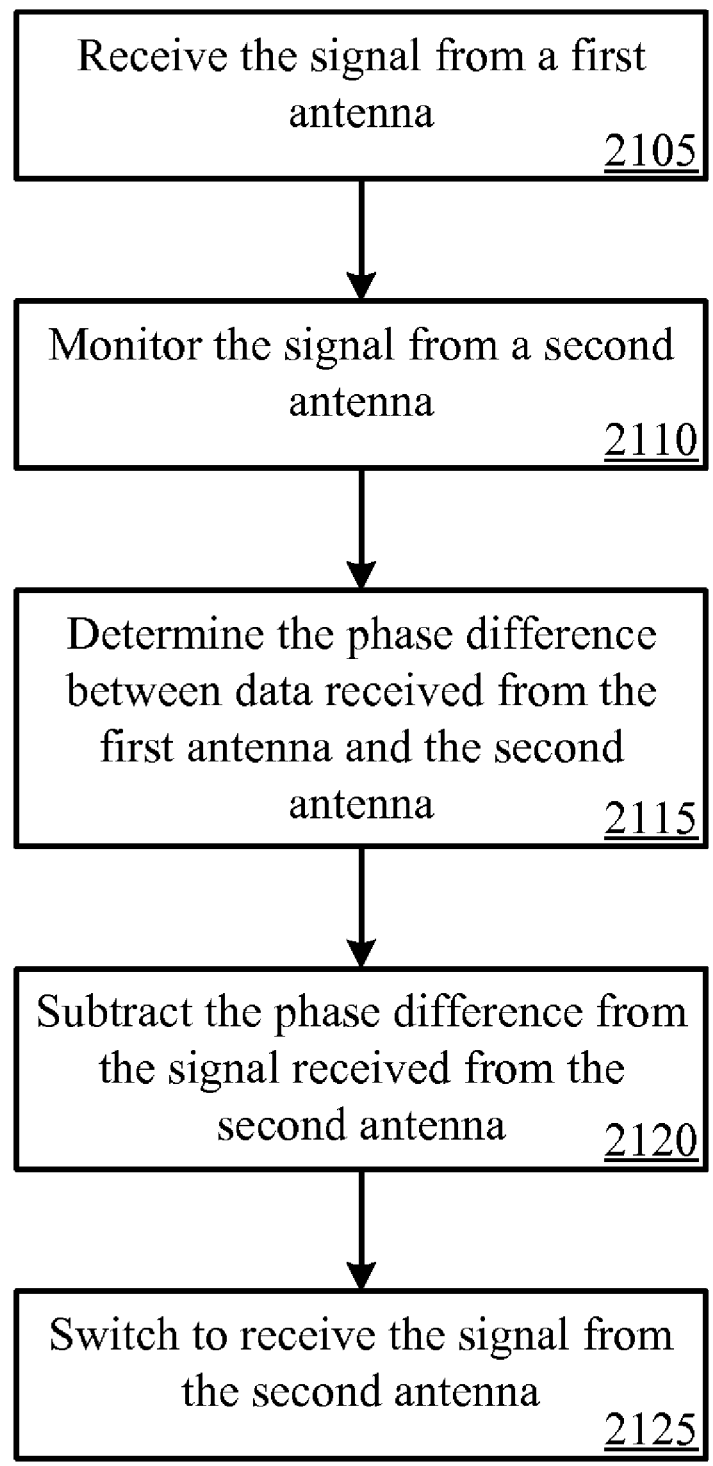
FIG. 21 shows a flowchart of a method for completing a soft transition from one antenna to another antenna according to one embodiment.

FIG. 21 shows a flowchart of a method for completing a soft transition from one antenna to another antenna according to one embodiment. Data is received at a first antenna at block 2105. The signal from a second antenna is monitored at block 2110. In some embodiments, the signal from the second antenna may occur in parallel with receiving data from the first antenna. The signal may be monitored to compare the signal strength, for example, between the first antenna and the second antenna in the same or different group. If the signal strength is greater in the second antenna, then the system may choose to switch to the second antenna.

At block 2115, the phase difference between the data received from the first antenna and the second antenna may be determined. For example, the phase difference may be determined by monitoring known data strings in the data headers. This phase difference may then be subtracted from the signal received at the second antenna at block 2120. This subtraction process may occur digitally, in some embodiments. The signal from the second antenna may then be received without a phase shift from the first signal received at the first antenna.

Figure 22:
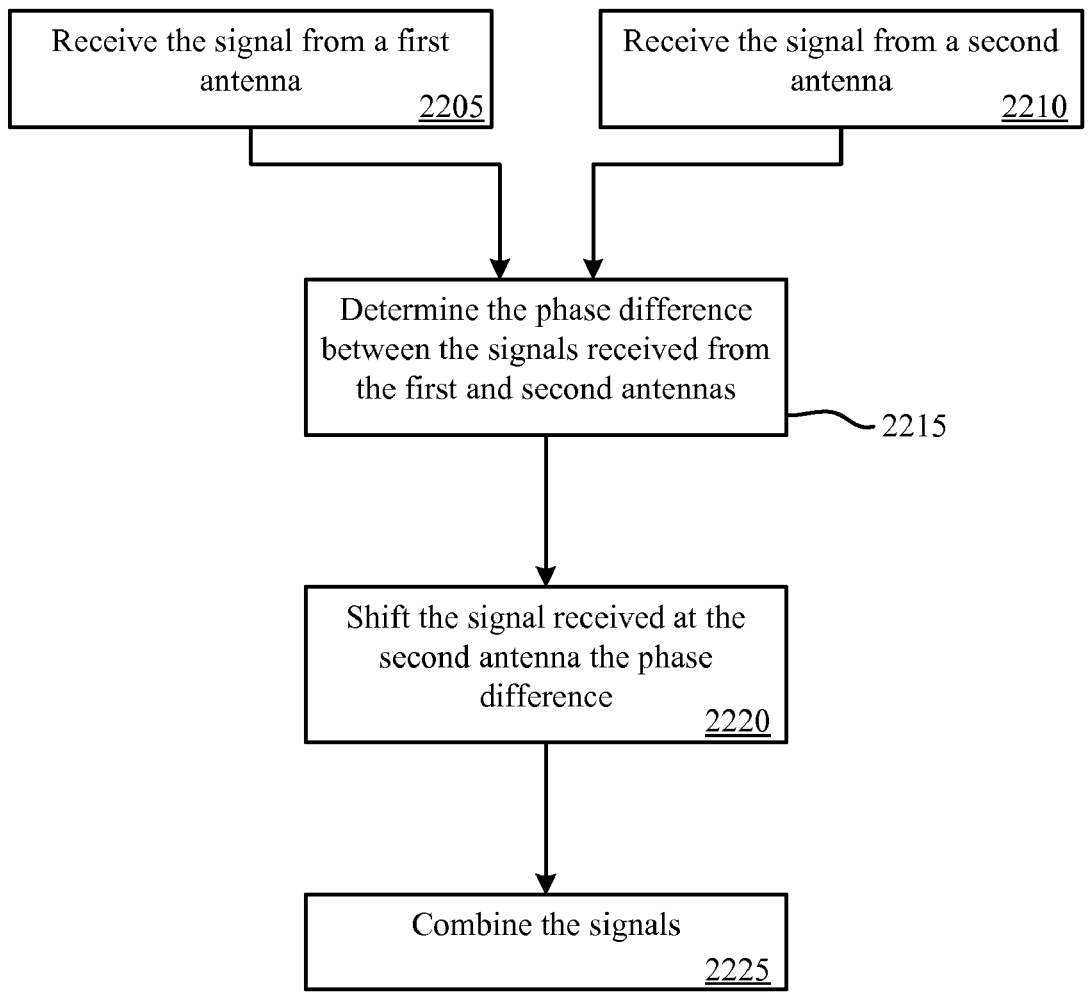
FIG. 22 shows a flowchart of a method for adjusting the phase of two received signals and combining the two signals.

FIG. 22 shows a flowchart of a method for adjusting the phase of two received signals and combining the two signals. The two signals are received at blocks 2205 and 2210. The phase difference between the two signals may be determined at block 2215 and the first and/or second signal may be shifted according to the phase difference at block 2220. The signals may then be combined at block 2225.

Figure 23:
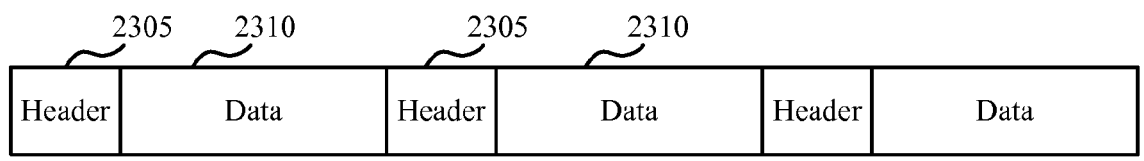
FIG. 23 shows an example of a data structure according to one embodiment.

FIG. 23 shows an example of a data structure according to one embodiment. As described above, the phase difference between signals received on different antennas may be determined by monitoring known data streams in a header file. As shown, the data structure includes a header 2305 and a data section 2310.

Figure 24:
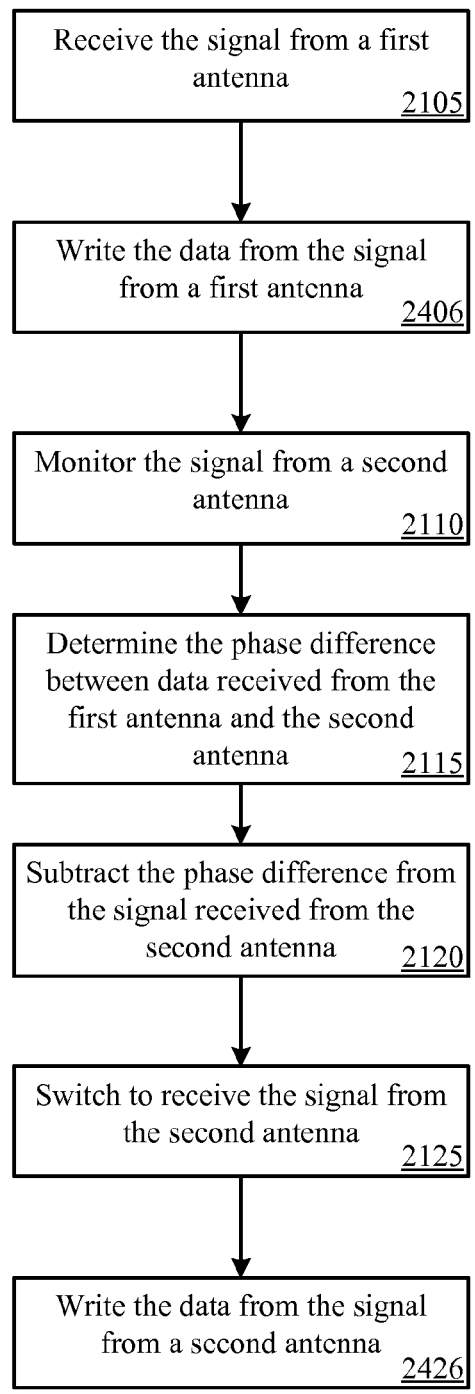
FIG. 24 shows another flowchart of a method for completing a soft transition from one antenna to another antenna according to one embodiment.

FIG. 24 shows another flowchart of a method for completing a soft transition from one antenna to another antenna according to one embodiment. This flow chart is similar to the one shown in FIG. 21. In this embodiment, however, the data is not only received at the first antenna at block 2105; the data is also written into data at block 2406. The signal from a second antenna is monitored at block 2110. At block 2115, the phase difference between the data received from the first antenna and the second antenna may be determined. This phase difference may then be subtracted from the signal received from the second antenna at block 2120. Similarly, data is received from the second antenna at block 2125 and is written into memory at block 2426.

Embodiments of the present invention may also conform to MIL-STD-461E and MIL-STD-464 according to another embodiment of the invention. To resist lightning strikes, high-altitude electromagnetic pulses (HEMP) and other threats, the outer shell and enclosure are conductive to dissipate electricity around the circuitry. Moreover, the connectors may be HEMP protected connectors and may include protective covers that may be engaged when not in use. The various components of the antenna assembly share a common ground; for example, the patch antennas, the RF antenna element, the radome 105, and/or the antenna assembly are DC grounded. The joints between patches may also provide conductive paths to ground. The Radome 105 may also provide RF shielding; for example, using the patch grounding pins. The Radome 105 and transceiver assembly, for example, may be grounded to a vehicle, for example, using an exterior lug or lugs. Moreover, the RF shielded bottom cover may also provide protection from lightening and HEMP.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

While the principles of the disclosure have been described above in connection with specific apparatuses and methods, it is to be clearly understood that this description is made only by way of example and not as limitation on the scope of the disclosure.

The attached appendix shows various exemplary embodiments of the invention in the form of a design review presentation. The appendix is by no means meant to be limiting. Rather, the material disclosed in the appendix is meant as exemplary only and to illustrate various embodiments of the invention.

What is claimed is:

1. A modular satellite transceiver comprising:
   an RF module operating in a first band, the RF module including one or more antennas, an RF front end module, a band converter, an analog-to-digital converter, and a digital-to-analog converter; and
   a back end module that includes a digital processing module;
   wherein the RF module is removably coupled with the back end module such that the RF module may be replaced with another RF module operating in a second band different from the first band;
   wherein during transmission the back end module is configured to provide at least one digital representation of a modulated analog transmit signal to the RF module for digital-to-analog conversion and transmission; and
   wherein during reception the RF module is configured to analog-to-digital convert at least one analog receive signal into at least one digital representation of a modulated analog receive signal, and provide the at least one digital representation of the modulated analog receive signal to the back end module for demodulation.

2. The modular satellite transceiver according to claim 1, wherein the back end module further comprises an encryption/decryption module.

3. The modular satellite transceiver according to claim 1, wherein the back end module provides power conditioning to at least the RF module.

4. The modular satellite transceiver according to claim 1, wherein the digital signal provided by the back end module is independent of communication waveform.

5. The modular satellite transceiver according to claim 1, wherein the digital signal provided by the back end module is independent of bandwidth.

6. The modular satellite transceiver according to claim 1, wherein the back end module packetizes the data prior to sending it to the RF module.

7. The modular satellite transceiver according to claim 1, wherein the back end module de-packetizes data received from the RF module.

8. A modular satellite transceiver comprising:
   an RF module comprising a first antenna, a second antenna, one or more amplifiers, a digital-to-analog converter, an analog-to-digital converter, an up converter and a down converter, wherein the RF module is configured to receive a packetized digital representation of a modulated analog transmit signal, convert the packetized digital representation of the modulated analog transmit signal into an analog transmit signal, up convert the analog transmit signal and transmit the analog transmit signal to a satellite through the first or second antenna, wherein the RF module is configured to receive an analog receive signal from the first or second antenna, down convert the analog receive signal, and digitize the analog receive signal to provide at least one packetized digital representation of a modulated analog receive signal; and a back end module removably coupled with the RF module and comprising at least a packetization module, wherein the back end module provides packetized digital representations of modulated analog transmit signals and receives packetized digital representations of modulated analog receive signals to and from the RF module.

9. The modular satellite transceiver according to claim 8, wherein the first antenna and the second antenna are substantially adjacent to one another within the RF module and arranged about a central location.

10. The modular satellite transceiver according to claim 8, wherein the RF module includes a central antenna about which the first antenna and the second antenna are arrayed.

11. A method for sending packetized data to a satellite using a modular transceiver that includes a back end module and an RF module, the method comprising:

digitally packetizing a data signal at the back end module to provide a packetized digital representation of a modulated transmit signal;

providing the packetized digital representation of the modulated transmit signal from the back end module to the RF module;

converting the packetized digital representation of the modulated transmit signal into an analog transmit signal at the RF module;

up converting the analog transmit signal at the RF module; and transmitting the analog transmit signal toward the satellite using a first antenna.

12. A method for receiving data from a satellite using a modular transceiver that includes a back end module and an RF module, the method comprising:

receiving an analog receive signal from a satellite with an antenna at the RF module;

down converting the analog receive signal at the RF module;

converting the down converted signal at the RF module into a digital representation of a modulated receive signal;

providing the digital representation of the modulated receive signal to the back end module; and digitally demodulating the digital representation of the modulated receive signal at the back end module.

* * * * *